United States Patent
Nagata et al.

(10) Patent No.: US 6,388,827 B2
(45) Date of Patent: May 14, 2002

(54) IMAGE DISPLAY APPARATUS HAVING THREE-DIMENSIONALLY DECENTERED OPTICAL PATH

(75) Inventors: Tetsuo Nagata, Hachioji; Takayoshi Togino, Koganei, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/861,534

(22) Filed: May 22, 2001

(30) Foreign Application Priority Data

May 22, 2000 (JP) ........................................ 2000-149673

(51) Int. Cl.[7] ................................................ G02B 5/04
(52) U.S. Cl. ........................ 359/831; 359/832; 359/630; 359/631; 359/632
(58) Field of Search ................................ 359/831, 832, 359/630, 631, 632, 830, 850, 637, 633, 640, 676, 678, 627, 629, 738

(56) References Cited

U.S. PATENT DOCUMENTS 6,185,045 B1 * 2/2001 Hanano ....................... 359/631
6,310,736 B1 * 10/2001 Togino ....................... 359/834
6,317,267 B1 * 11/2001 Takahashi ................... 359/630

* cited by examiner

Primary Examiner—Mohammad Sikder
(74) Attorney, Agent, or Firm—Pillsbury Winthrop LLP

(57) ABSTRACT

An image display apparatus having a three-dimensionally decentered optical path to attain a reduction in overall size of the apparatus and to place constituent members effectively in a dead space, thereby permitting the apparatus to be designed in a variety of ways. The apparatus includes an image display device and a viewing optical system for leading an image formed by the image display device to a pupil. The viewing optical system has at least a first reflecting surface and a second reflecting surface positioned closer to the pupil than the first reflecting surface along the optical path. A first plane defined by the optical axis incident on the first reflecting surface and the optical axis reflected therefrom and a second plane defined by the optical axis incident on the second reflecting surface and the optical axis reflected therefrom intersect each other at an arbitrary angle, thereby forming a three-dimensionally decentered optical path. At least either one of the first and second reflecting surfaces has a curved surface configuration.

24 Claims, 16 Drawing Sheets

IMAGE DISPLAY APPARATUS HAVING THREE-DIMENSIONALLY DECENTERED OPTICAL PATH

This application claims benefit of Japanese Application No. 2000-149673 filed in Japan on May 22, 2000, the contents of which are incorporated by this reference.

BACKGROUND OF THE INVENTION

1. Field of the Invention

The present invention relates to image display apparatus having a three-dimensionally decentered optical path. More particularly, the present invention relates to a head- or face-mounted image display apparatus that can be retained on an observer's head or face.

2. Discussion of Related Art

An image display apparatus using a single decentered prism has heretofore been known, for example, in Japanese Patent Application Unexamined Publication (KOKAI) No. Hei 7-333551. The decentered prism has reflecting surfaces arranged to effect two internal reflections. One of the reflecting surfaces is a totally reflecting surface serving as both a reflecting surface and a transmitting surface.

The conventional image display apparatus using the decentered prism suffers, however, from some problems. That is, when the image display device used therein decreases in size, it is necessary to shorten the focal length of the optical system while ensuring the required eye relief. Therefore, it is difficult to construct a viewing optical system of wide field angle.

To solve the above-described problem, the present applicant proposed an image display apparatus in Japanese Patent Application Unexamined Publication (KOKAI) No. 2000-66106, in which a decentered prism similar to the above is disposed on the pupil side, and another decentered prism is disposed on the image display device side.

The above-described arrangement using a combination of two decentered prisms forms a two-dimensionally decentered optical system, and the two decentered prisms have the same decentration plane. Consequently, the image display apparatus is likely to increase in size in the direction of decentration. Therefore, it is difficult to achieve a compact image display apparatus.

Further, an image display apparatus requires various constituent members such as an image display device, a circuit for driving it and an illuminating system in addition to a viewing optical system. With the above-described arrangement, these members cannot effectively be placed in a dead space.

In addition, design is very important for image display apparatus. With the above-described arrangement, the design freedom is limited to a very low degree.

SUMMARY OF THE INVENTION

The present invention was made in view of the above-described problems with the prior art.

An object of the present invention is to provide an image display apparatus attaining a reduction in overall size of the apparatus by using an optical system in which all the segments of an axial principal ray extending from a pupil to an image display device are not within the same plane. The image display apparatus further allows various constituent members to be effectively placed in a dead space, thereby permitting the image display apparatus to be designed in a variety of ways.

Another object of the present invention is to provide an image display apparatus favorably corrected for decentration aberrations despite the use of an optical system decentered in a three-dimensional space.

To attain the above-described objects, the present invention provides an image display apparatus having a three-dimensionally decentered optical path. The image display apparatus includes an image display device and a viewing optical system for leading an image formed by the image display device to a pupil corresponding to a position where an observer's eyeball is to be placed.

The viewing optical system has at least a first reflecting surface and a second reflecting surface positioned closer to the pupil than the first reflecting surface along the optical path. A first plane defined by the optical axis incident on the first reflecting surface and the optical axis reflected therefrom and a second plane defined by the optical axis incident on the second reflecting surface and the optical axis reflected therefrom intersect each other at an arbitrary angle, thereby forming a three-dimensionally decentered optical path. At least either one of the first and second reflecting surfaces has a curved surface configuration.

The reasons for adopting the above-described arrangement in the present invention, together with the function thereof, will be described below.

The image display apparatus according to the present invention includes an image display device and a viewing optical system for leading an image formed by the image display device to a pupil corresponding to a position where an observer's eyeball is to be placed. The viewing optical system has at least a first reflecting surface and a second reflecting surface disposed closer to the pupil along the optical path. The first reflecting surface corresponds to the surface 24 in Examples (described later). The second reflecting surface corresponds to the surface 22. The optical system is arranged so that a first plane defined by the optical axis incident on the first reflecting surface and the optical axis reflected therefrom and a second plane defined by the optical axis incident on the second reflecting surface and the optical axis reflected therefrom do not extend in the same plane or parallel to each other but intersect each other at an arbitrary angle, whereby the viewing optical system can be decentered three dimensionally. Accordingly, it is possible to fold the optical system in any desired direction and hence possible to reduce the overall size of the image display apparatus. Thus, it is possible to provide an image display apparatus having a minimized dead space in consideration of other associated members. In addition, the degree of design freedom increases favorably.

In a case where a decentered optical system is used as a viewing optical system of a head-mounted image display apparatus, it is desirable with a view to eliminating a dead space and further reducing the overall size of the apparatus to arrange the optical system so that a first plane defined by the optical axis incident on the first reflecting surface and the optical axis reflected therefrom and a second plane defined by the optical axis incident on the second reflecting surface and the optical axis reflected therefrom intersect each other at an arbitrary angle, as stated above. In such a case, the optical system must inevitably be decentered three dimensionally, and this causes rotationally asymmetric aberrations to occur. It is impossible to correct the rotationally asymmetric aberrations by only a rotationally symmetric optical system. The best surface configuration for correcting the rotationally asymmetric aberrations due to three-dimensional decentration is a rotationally asymmetric surface. Therefore, in the image display apparatus according to the present invention, it is desirable that at least either one of the first and second reflecting surfaces should have a rotationally asymmetric curved surface configuration that corrects decentration aberrations.

It is preferable that the viewing optical system should have at least one reflecting surface in addition to the first and second reflecting surfaces, i.e. reflecting surfaces corresponding to the surfaces 12, 13, 22, 23 and 24 in Examples (described later), and at least two of the plurality of reflecting surfaces should have a rotationally asymmetric curved surface configuration that corrects decentration aberrations.

In the present invention, a free-form surface is used as a typical example of a surface having a rotationally asymmetric curved surface configuration. A free-form surface is defined by the following equation. The Z-axis of the defining equation is the axis of a free-form surface.

$$Z = cr^2 / \left[1 + \sqrt{\{1 - (1+k)c^2 r^2\}}\right] + \sum_{j=2}^{66} C_j X^m Y^n \quad (a)$$

In the equation (a), the first term is a spherical surface term, and the second term is a free-form surface term.

In the spherical surface term:
c: the curvature at the vertex
k: a conic constant
$r = \sqrt{(X^2 + Y^2)}$
The free-form surface term is given by $$\sum_{j=2}^{66} C_j X^m Y^n = C_2 X + C_3 Y + C_4 X^2 + C_5 XY + C_6 Y^2 +$$
$$C_7 X^3 + C_8 X^2 Y + C_9 XY^2 + C_{10} Y^3 + C_{11} X^4 +$$
$$C_{12} X^3 Y + C_{13} X^2 Y^2 + C_{14} XY^3 + C_{15} Y^4 +$$
$$C_{16} X^5 + C_{17} X^4 Y + C_{18} X^3 Y^2 + C_{19} X^2 Y^3 +$$
$$C_{20} XY^4 + C_{21} Y^5 + C_{22} X^6 + C_{23} X^5 Y +$$
$$C_{24} X^4 Y^2 + C_{25} X^3 Y^3 + C_{26} X^2 Y^4 + C_{27} XY^5 +$$
$$C_{28} Y^6 + C_{29} X^7 + C_{30} X^6 Y + C_{31} X^5 Y^2 +$$
$$C_{32} X^4 Y^3 + C_{33} X^3 Y^4 + C_{34} X^2 Y^5 + C_{35} XY^6 +$$
$$C_{36} Y^7 \ldots$$

where $C_j$ (j is an integer of 2 or higher) are coefficients.

In general, the above-described free-form surface does not have planes of symmetry in both the XZ- and YZ-planes. However, a free-form surface having only one plane of symmetry parallel to the YZ-plane is obtained by making all terms of odd-numbered degrees with respect to X zero. A free-form surface having only one plane of symmetry parallel to the XZ-plane is obtained by making all terms of odd-numbered degrees with respect to Y zero.

In addition, free-form surfaces as the above-described surfaces with a rotationally asymmetric curved surface configuration may be defined by Zernike polynomials. That is, the configuration of a free-form surface may be defined by the following equation (b). The Z-axis of the defining equation (b) is the axis of Zernike polynomial. A rotationally asymmetric surface is defined by polar coordinates of the height of the Z-axis with respect to the XY-plane. In the equation (b), A is the distance from the Z-axis in the XY-plane, and R is the azimuth angle about the Z-axis, which is expressed by the angle of rotation measured from the Z-axis.

$$x = R \times \cos(A) \quad (b)$$
$$y = R \times \sin(A)$$
$$Z = D_2 + D_3 R \cos(A) + D_4 R \sin(A) + D_5 R^2 \cos(2A) +$$
$$D_6 (R^2 - 1) + D_7 R^2 \sin(2A) + D_8 R^3 \cos(3A) +$$
$$D_9 (3R^3 - 2R) \cos(A) + D_{10} (3R^3 - 2R) \sin(A) +$$
$$D_{11} R^3 \sin(3A) + D_{12} R^4 \cos(4A) + D_{13} (4R^4 - 3R^2) \cos(2A) +$$
$$D_{14} (6R^4 - 6R^2 + 1) + D_{15} (4R^4 - 3R^2) \sin(2A) +$$
$$D_{16} R^4 \sin(4A) + D_{17} R^5 \cos(5A) + D_{18} (5R^5 - 4R^3) \cos(3A) +$$
$$D_{19} (10R^5 - 12R^3 + 3R) \cos(A) +$$
$$D_{20} (10R^5 - 12R^3 + 3R) \sin(A) + D_{21} (5R^5 - 4R^3) \sin(3A) +$$
$$D_{22} R^5 \sin(5A) + D_{23} R^6 \cos(6A) + D_{24} (6R^6 - 5R^4) \cos(4A) +$$
$$D_{25} (15R^6 - 20R^4 + 6R^2) \cos(2A) +$$
$$D_{26} (20R^6 - 30R^4 + 12R^2 - 1) +$$
$$D_{27} (15R^6 - 20R^4 + 6R^2) \sin(2A) +$$
$$D_{28} (6R^6 - 5R^4) \sin(4A) + D_{29} R^6 \sin(6A) \ldots$$

where $D_m$ (m is an integer of 2 or higher) are coefficients. It should be noted that to design an optical system symmetric with respect to the X-axis direction, $D_4$, $D_5$, $D_6$, $D_{10}$, $D_{11}$, $D_{12}$, $D_{13}$, $D_{14}$, $D_{20}$, $D_{21}$, $D_{22}$ . . . should be used.

The above defining equations are shown to exemplify surfaces with a rotationally asymmetric curved surface configuration. Therefore, the same advantageous effects can be obtained for any other defining equation that expresses such a rotationally asymmetric surface.

It should be noted that other examples of defining equations for free-form surfaces include the following defining equation (c):

$$Z = \Sigma \Sigma C_{nm} XY$$

Assuming that k=7 (polynomial of degree 7), for example, a free-form surface is expressed by an expanded form of the above equation as follows:

$$Z = C_2 + C_3 Y + C_4 |X| + C_5 Y^2 + C_6 Y|X| + C_7 X^2 + \quad (c)$$
$$C_8 Y^3 + C_9 Y^2 |X| + C_{10} YX^2 + C_{11} |X^3| + C_{12} Y^4 +$$
$$C_{13} Y^3 |X| + C_{14} Y^2 X^2 + C_{15} Y |X^3| + C_{16} X^4 +$$
$$C_{17} Y^5 + C_{18} Y^4 |X| + C_{19} Y^3 X^2 + C_{20} Y^2 |X^3| + C_{21} YX^4 +$$
$$C_{22} |X^5| + C_{23} Y^6 + C_{24} Y^5 |X| + C_{25} Y^4 X^2 + C_{26} Y^3 |X^3| +$$
$$C_{27} Y^2 X^4 + C_{28} Y |X^5| + C_{29} X^6 + C_{30} Y^7 + C_{31} Y^6 |X| +$$
$$C_{32} Y^5 X^2 + C_{33} Y^4 |X^3| + C_{34} Y^3 X^4 + C_{35} Y^2 |X^5| +$$
$$C_{36} YX^6 + C_{37} |X^7|$$

It should be noted that an anamorphic surface or a toric surface is also usable as a surface having a rotationally asymmetric curved surface configuration.

The viewing optical system may be formed from a prism member. The prism member may have at least the first and second reflecting surfaces provided on prism surfaces, together with a first transmitting surface through which a display light beam from the image display device enters the prism member, and a second transmitting surface through which the display light beam exits the prism member toward the pupil. The prism member corresponds to a combination of an ocular prism and an optical path distributing prism that are integrated into a single prism member or separate from each other in Examples (described later).

In this case, it is desirable that the prism member should have at least one reflecting surface closer to the pupil than the second reflecting surface, and this reflecting surface should have a rotationally asymmetric curved surface configuration that corrects decentration aberrations.

It is preferable that the prism member should have a third reflecting surface and a fourth reflecting surface closer to the pupil than the second reflecting surface, and a third plane defined by the optical axis incident on the third reflecting surface and the optical axis reflected therefrom should intersect the second plane defined with respect to the second reflecting surface at an angle, and further a fourth plane defined by the optical axis incident on the fourth reflecting surface and the optical axis reflected therefrom should be in the same plane as the third plane, and further at least either one of the third and fourth reflecting surfaces should have a rotationally asymmetric curved surface configuration that corrects decentration aberrations. All of Examples (described later) have an arrangement corresponding to the above-described arrangement of the prism member.

In this case, it is desirable that both the third and fourth reflecting surfaces should have a rotationally asymmetric curved surface configuration that corrects decentration aberrations.

It is preferable to arrange the prism member so that a light beam is incident on the second transmitting surface at an angle exceeding the total reflection critical angle, thereby allowing the second transmitting surface to serve also as the third reflecting surface. In other words, the third reflecting surface is formed from the identical surface with the second transmitting surface. Thus, the light beam reflected by the totally reflecting action of the third reflecting surface is reflected by the fourth reflecting surface, and the light beam reflected from the fourth reflecting surface passes through the second transmitting surface to exit the prism member. All of Examples (described later) have an arrangement corresponding to the above-described arrangement of the prism member.

It is preferable that the prism member should have a plurality of reflecting surfaces, including the first reflecting surface, in the optical path between the first transmitting surface and the second reflecting surface, and at least one of the plurality of reflecting surfaces, exclusive of the first reflecting surface, should have a rotationally asymmetric curved surface configuration that corrects decentration aberrations. The optical path distributing prism in Examples (described later) has an arrangement corresponding to the above-described arrangement of the prism member.

The prism member may have the first reflecting surface and a fifth reflecting surface in the order mentioned along the optical path between the first transmitting surface and the second reflecting surface. In this case, a fifth plane defined by the optical axis incident on the fifth reflecting surface and the optical axis reflected therefrom is in the same plane as the first plane defined with respect to the first reflecting surface. All of Examples (described later) have an arrangement corresponding to the above-described arrangement of the prism member.

In this case, the prism member may be arranged as follows. The first reflecting surface is provided on a surface of the prism member at a tilt so as to reflect the light beam entering through the first transmitting surface toward a position closer to the second reflecting surface than the direction of incidence of the light beam. The fifth reflecting surface is provided on a surface of the prism member at a tilt so as to reflect the light beam reflected from the first reflecting surface toward a position closer to the second reflecting surface than the direction of incidence of the light beam. Examples 1 and 2 (described later) have an arrangement corresponding to the above-described arrangement of the prism member.

Further, the prism member may be arranged as follows. The first reflecting surface is provided on a surface of the prism member at a tilt so as to reflect the light beam entering through the first transmitting surface toward a position more away from the second reflecting surface than the direction of incidence of the light beam. The fifth reflecting surface is provided on a surface of the prism member at a tilt so as to reflect the light beam reflected from the first reflecting surface toward a position closer to the second reflecting surface than the direction of incidence of the light beam. Thus, the prism member is arranged so that an optical path connecting the first transmitting surface and the first reflecting surface and an optical path connecting the fifth reflecting surface and the second reflecting surface intersect each other within the prism member. Examples 3 and 4 (described later) have an arrangement corresponding to the above-described arrangement of the prism member.

The prism member may have a first prism and a second prism that are separated by at least an air layer. In this case, the first prism has at least the first reflecting surface and the second reflecting surface and forms a three-dimensionally decentered optical path. All of Examples (described later) have an arrangement corresponding to the above-described arrangement of the prism member.

In this case, the first prism may have a first prism exit surface through which the light beam reflected from the second reflecting surface exits the first prism toward the second prism. In this arrangement, there is no reflecting surface between the second reflecting surface and the first prism exit surface. All of Examples (described later) have an arrangement corresponding to the above-described arrangement of the prism member.

It is desirable that the prism member should have a first prism and a second prism that are separated by at least an air layer, and an exit surface of the first prism that faces the second prism across the air layer should have a rotationally asymmetric curved surface configuration that corrects decentration aberrations.

It is also desirable that the prism member should have a first prism and a second prism that are separated by at least an air layer, and an entrance surface of the second prism that faces the first prism across the air layer should have a rotationally asymmetric curved surface configuration that corrects decentration aberrations.

The first transmitting surface should preferably have a rotationally asymmetric curved surface configuration that corrects decentration aberrations.

It is also preferable that the second transmitting surface should have a rotationally asymmetric curved surface configuration that corrects decentration aberrations.

The viewing optical system should preferably be arranged to form the image of the image display device as an intermediate image in the vicinity of the second reflecting surface and to lead the intermediate image to the pupil. All of Examples (described later) have an arrangement corresponding to the above-described arrangement of the viewing optical system.

In this case, the viewing optical system should preferably be arranged to form the intermediate image at a position closer to the pupil than the second reflecting surface.

The above-described rotationally asymmetric curved surface configuration that corrects decentration aberrations should preferably be formed from a rotationally asymmetric aspherical surface having not more than two planes of symmetry. The rotationally asymmetric aspherical surface should preferably be a free-form surface having only one plane of symmetry.

The present invention also includes an image pickup apparatus in which an image pickup device is provided in place of the image display device in the above-described arrangement. In this case, the pupil is arranged as an entrance pupil through which a light beam from a subject passes, and the viewing optical system is used as an image-forming optical system that focuses the light beam from the subject to form a subject image on the image pickup device.

Further, the present invention includes a projection apparatus in which a projection image plane is provided in place of the image display device in the foregoing arrangement. When a screen is placed in front of the pupil, the viewing optical system is used as a projection optical system that projects a light beam from the projection image plane onto the screen as a projected image.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 11($b$) is a front view showing the optical surfaces and the principal rays in the optical system of the head-mounted image display apparatus as seen from the observer's side.

DESCRIPTION OF THE PREFERRED EMBODIMENTS

The image display apparatus having a three-dimensionally decentered optical path according to the present invention will be described below by way of Examples.

A coordinate system used in the following Examples is defined as follows. The direction of the observer's visual axis (forward direction) is defined as a Z-axis. The horizontal direction is defined as an X-axis, and the vertical direction is defined as a Y-axis.

Numerical data (shown later) in each Example is data obtained by backward ray tracing from a pupil 1 to an image display device (image plane) 3. The following description of the arrangement will also be made in the order of backward ray tracing.

In Examples 1 to 4 shown below, an ocular prism 10 is a decentered prism that is two-dimensionally decentered in the YZ-plane. An optical path distributing prism 20 is positioned closer to the image display device 3 than the ocular prism 10. The optical path distributing prism 20 is a three-dimensionally decentered prism in which all the segments of the axial principal ray are not present in the same plane. Examples 1 to 4 will be described below with reference to the accompanying drawings.

EXAMPLE 1

Figure 1:
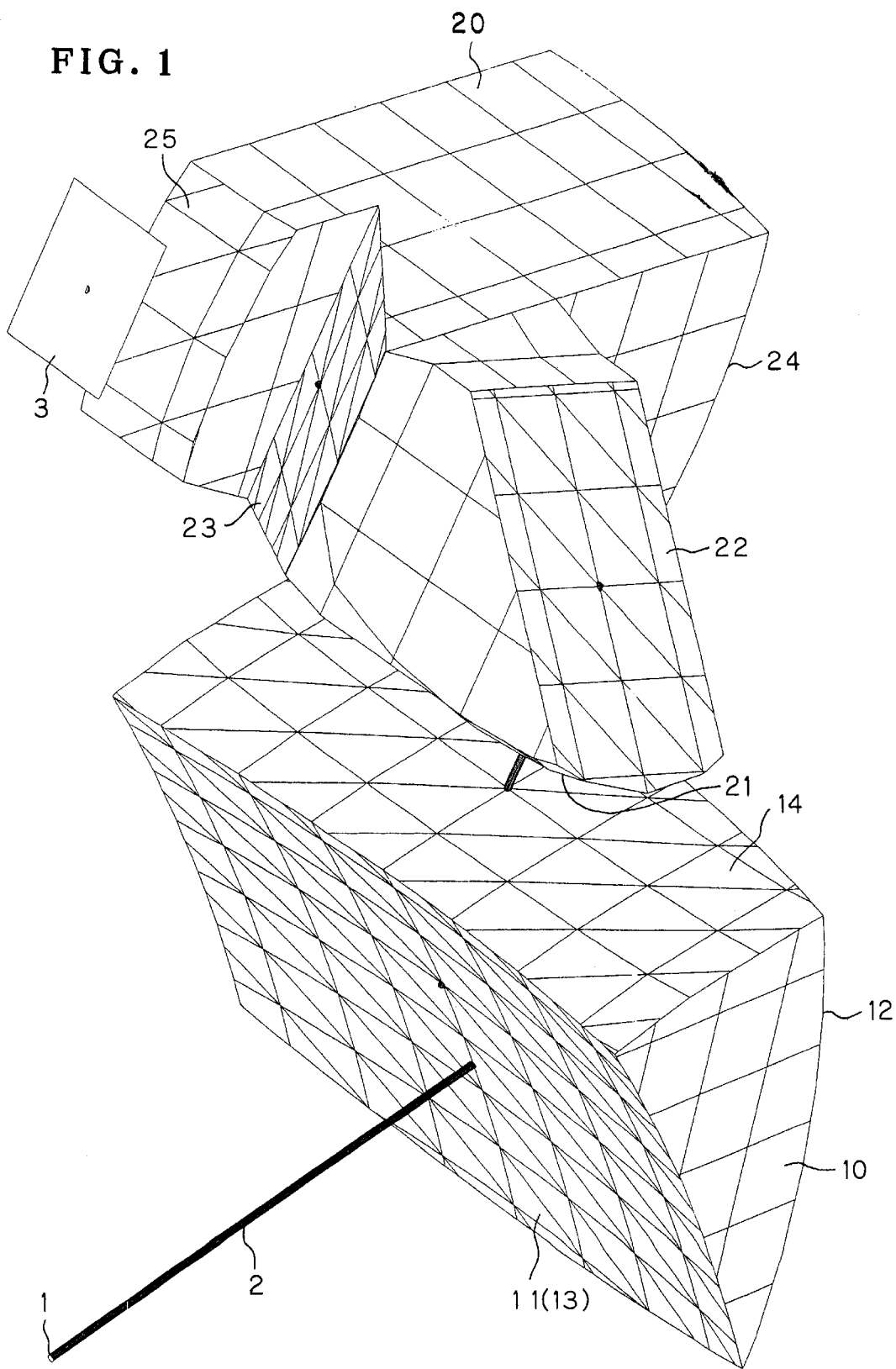
FIG. 1 is a perspective view of an optical system of an image display apparatus according to Example 1 of the present invention.
Figure 2:
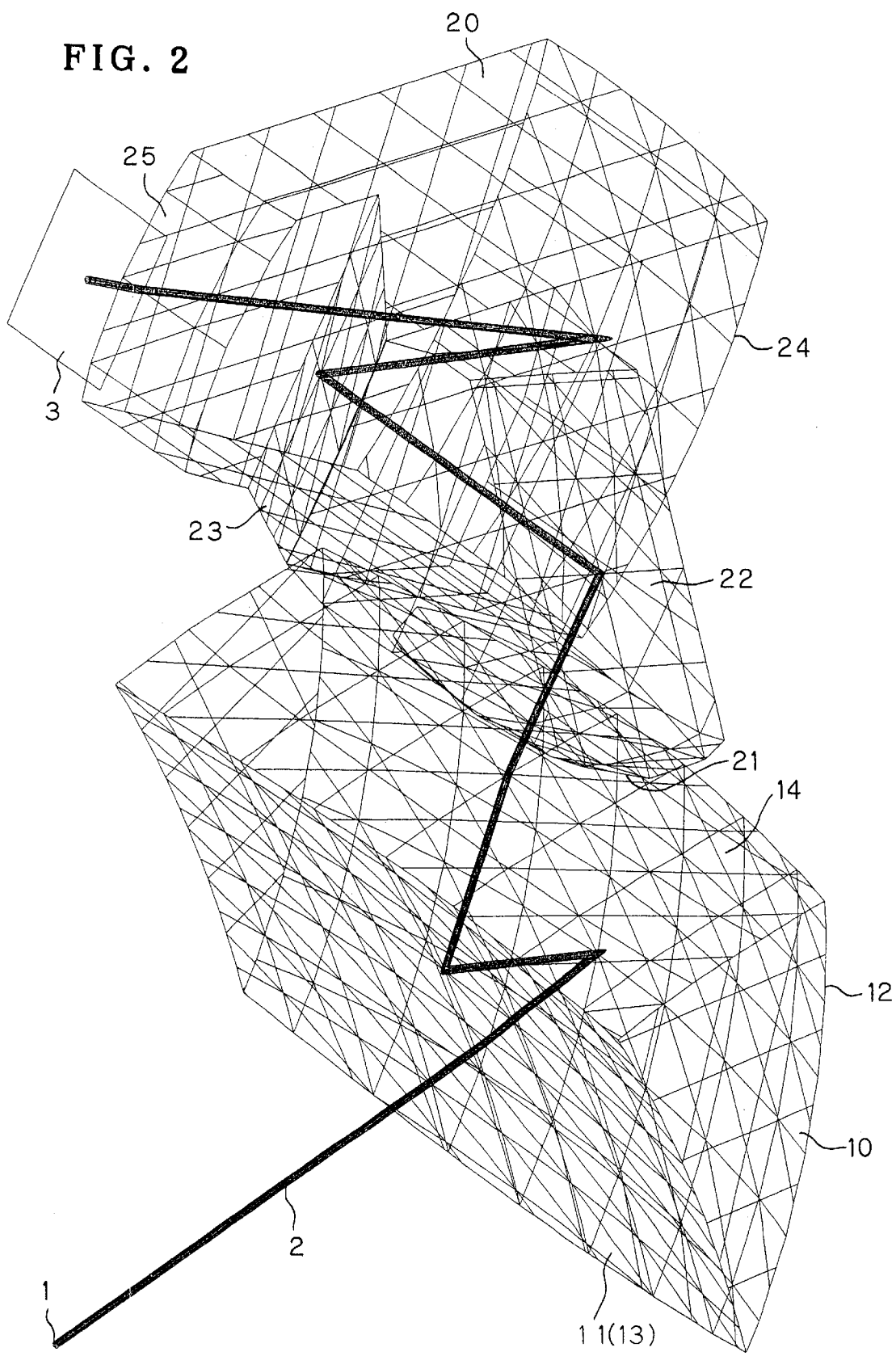
FIG. 2 is a perspective view showing an axial principal ray in the optical system according to Example 1.
Figure 3:
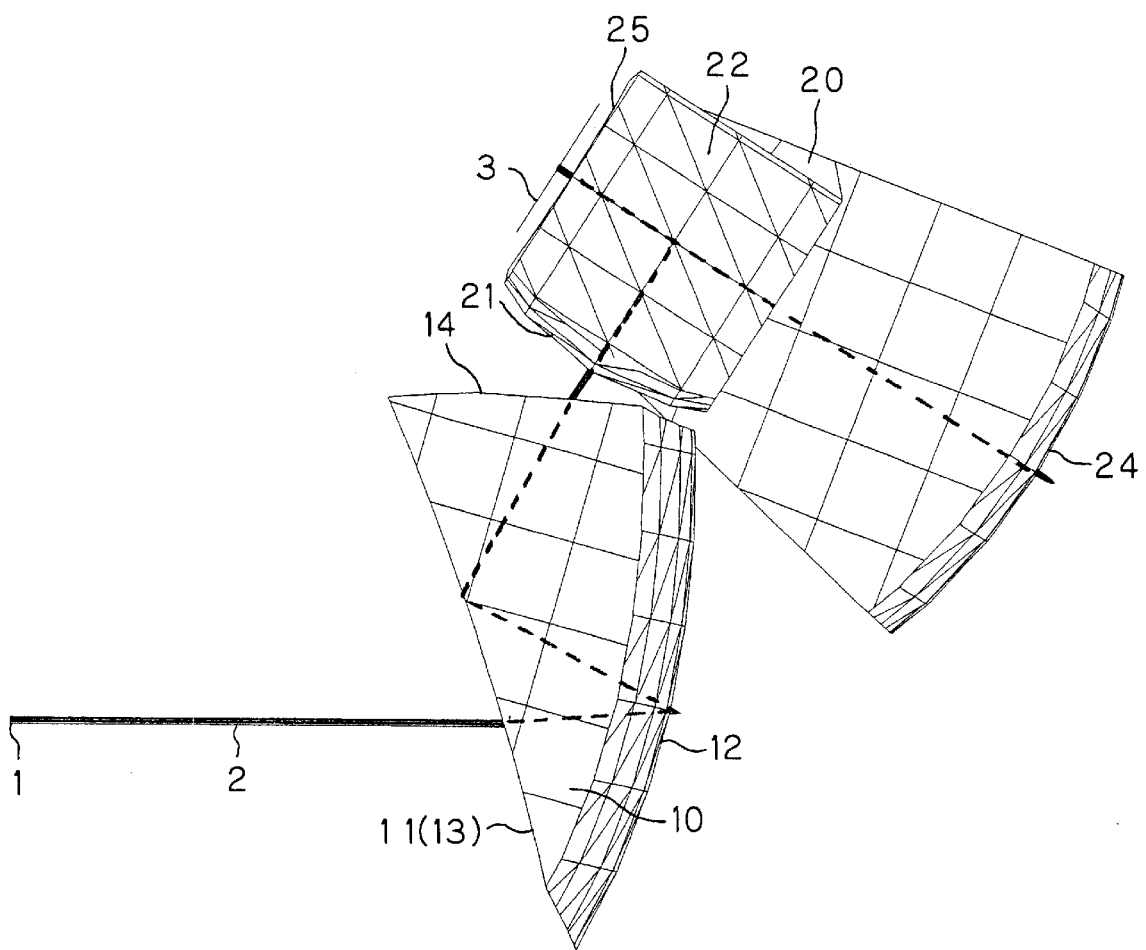
FIG. 3 is a right-hand side view of the optical system according to Example 1.
Figure 4:
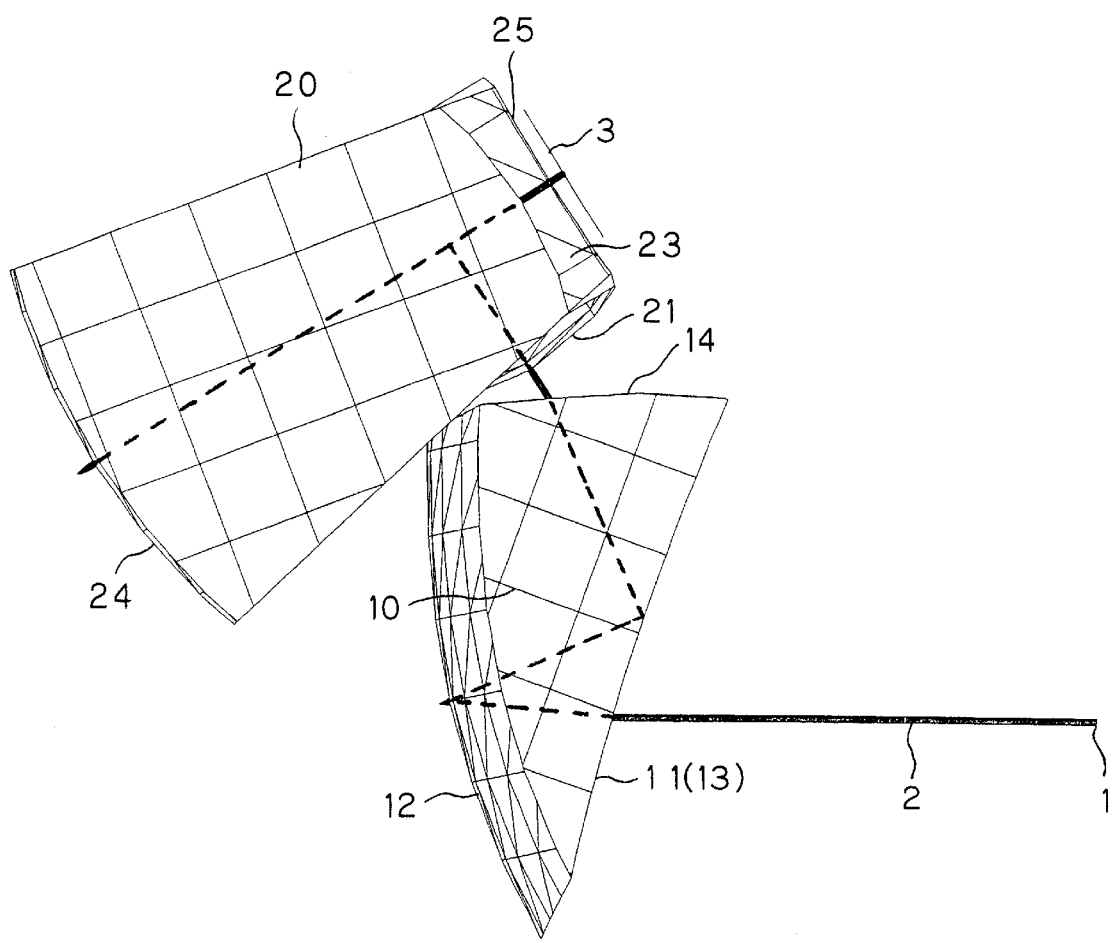
FIG. 4 is a left-hand side view of the optical system according o Example 1.
Figure 5:
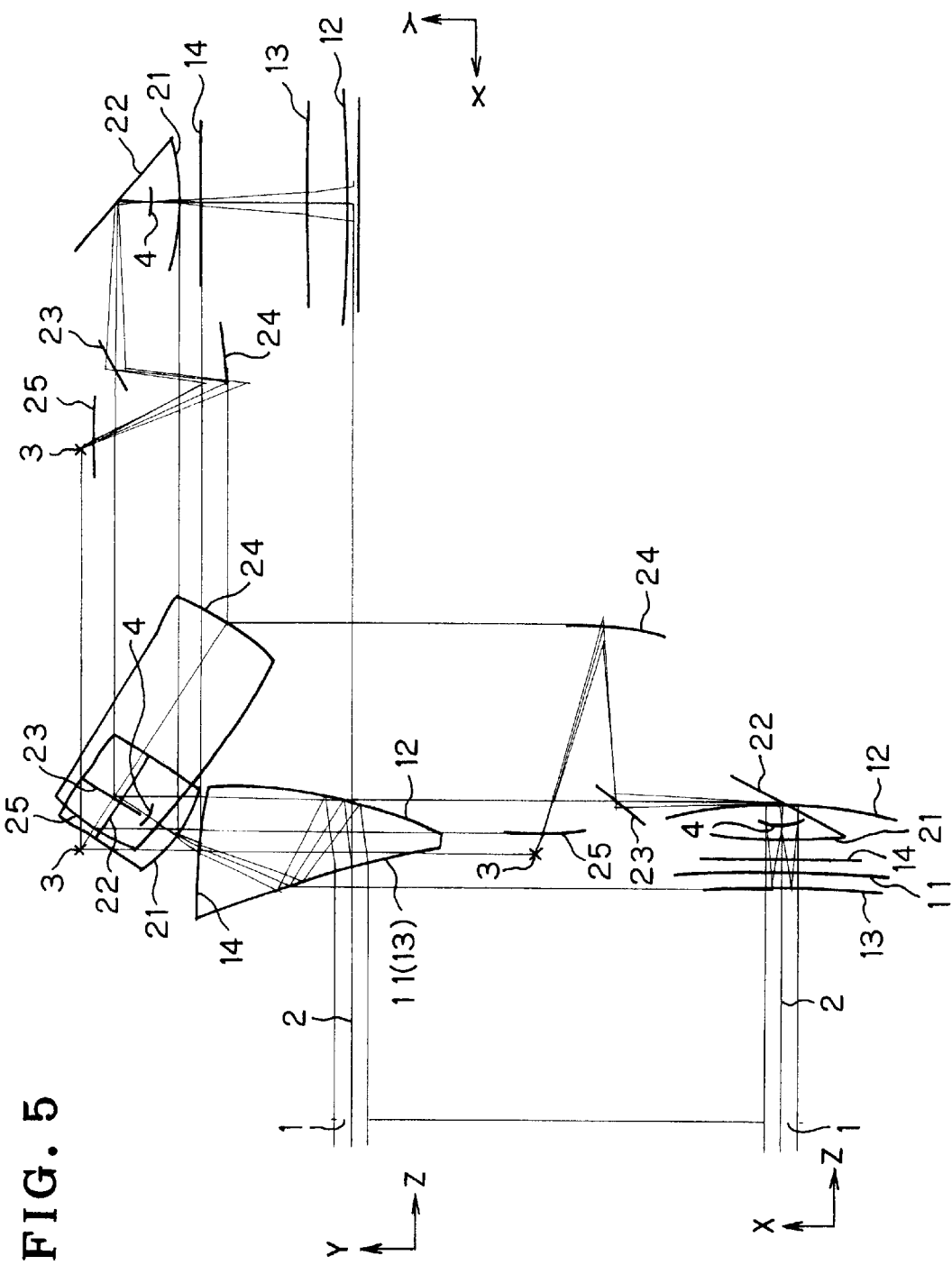
FIG. 5 is a three-plane view showing optical surfaces and principal rays in the optical system according to Example 1.

FIG. 1 is a perspective view of the optical system of an image display apparatus according to Example 1. FIG. 2 is a perspective view showing the axial principal ray 2 in the optical system according to Example 1. FIG. 3 is a right-hand side view of the optical system in Example 1. FIG. 4 is a left-hand side view of the optical system in Example 1. FIG. 5 is a three-plane view showing optical surfaces and principal rays in the optical system according to Example 1. It should be noted that in FIGS. 1 to 4, surfaces are expressed in the form of meshes.

The illustrated optical system is an optical system for a right eye when it is arranged for use in a head-mounted image display apparatus designed to be fitted for both eyes. An optical system for a left eye is constructed in plane symmetry with respect to the YZ-plane. The same is the case with the following Examples.

In the optical system, the axial principal ray (optical axis) 2 in the backward ray tracing emerges from the pupil 1 where the pupil of an observer's right eye should be positioned in a case where the optical system is arranged for use in a head-mounted image display apparatus. The axial principal ray 2 enters the ocular prism 10 while being refracted through a surface 11 of the ocular prism 10. The surface 11 also serves as a totally reflecting surface 13. Then, the axial principal ray 2 is internally reflected by a surface 12 and incident on the surface 13 at an angle exceeding the critical angle. Consequently, the axial principal ray 2 is totally reflected by the surface 13 and exits the ocular prism 10 while being refracted through a surface 14. Then, the axial principal ray 2 enters the optical path distributing prism 20 while being refracted through a surface 21. The axial principal ray 2 is internally reflected by a surface 22 and further internally reflected by a surface 23. Then, the axial principal ray 2 is internally reflected by a surface 24 and exits the optical path distributing prism 20 while being refracted through a surface 25. Then, the axial principal ray 2 reaches the image display device 3.

The surfaces 11 to 14 of the ocular prism 10 are in plane symmetry with respect to the YZ-plane and each two-dimensionally decentered in the YZ-plane.

The axial principal ray 2 exiting the ocular prism 10 enters the optical path distributing prism 20 through the surface 21 and is then reflected by the reflecting surface 22 in a direction not in the same plane as the decentration direction (Y-direction) of the ocular prism 10. In this Example, a plane H1 defined by points of intersection between the axial principal ray 2 and the surfaces 12, 13 and 14 and a plane H 2 defined by points of intersection between the axial principal ray 2 and the surfaces 21, 22 and 23 are not identical with each other but decentered in an orthogonal relation to each other. Thereafter, the axial principal ray 2 is reflected by the surface 23 away from the pupil 1 and then reflected by the surface 24 toward the pupil 1. The surfaces 23 and 24 are decentered in a direction perpendicularly intersecting the decentration plane (YZ-plane) of the ocular prism 10. The axial principal ray 2 reflected from the surface 24 passes through the surface 25 to reach the image display device 3 placed on the observer's side of the optical path distributing prism 20.

At least one reflecting surface of each of the ocular prism 10 and the optical path distributing prism 20 has a positive power so that both the ocular prism 10 and the optical path distributing prism 20 have a positive power. Thus, an intermediate image 4 of the image display device 3 is formed in the vicinity of the surface 21 (the same is the case with the other Examples).

By three-dimensionally decentering the optical system as stated above, the optical system can be folded in a desired direction. Accordingly, the whole image display apparatus can be constructed in a compact form. Thus, it is possible to provide an image display apparatus having a minimized dead space in consideration of other members. In addition, the degree of design freedom increases favorably.

It should be noted that in this Example decentration aberrations can be favorably corrected at a horizontal field angle of 35°, as will be clear from the aberrational diagram (described later).

Further, the axial principal ray 2 from the two-dimensionally decentered ocular prism 10 is three-dimensionally decentered by the reflecting surface 22 of the optical path distributing prism 20 so that the direction of decentration thereafter is perpendicular to the decentration direction of the ocular prism 10. Accordingly, the apparatus can be prevented from increasing in size.

In addition, it becomes unnecessary to place the image display device 3 horizontally by rotating the reflecting surface 22 of the optical path distributing prism 20 about an axis parallel to the vertical direction (Y-axis). If the reflecting surface 22 is rotated through 45° as in this Example, the image display device 3 can be placed vertically. Accordingly, it is possible to prevent the image display apparatus from increasing in size in the horizontal direction. Further, even if the aspect ratio of the image display device 3 is set at 9:16, the overall size of the apparatus will not become very large.

EXAMPLE 2

Figure 6:
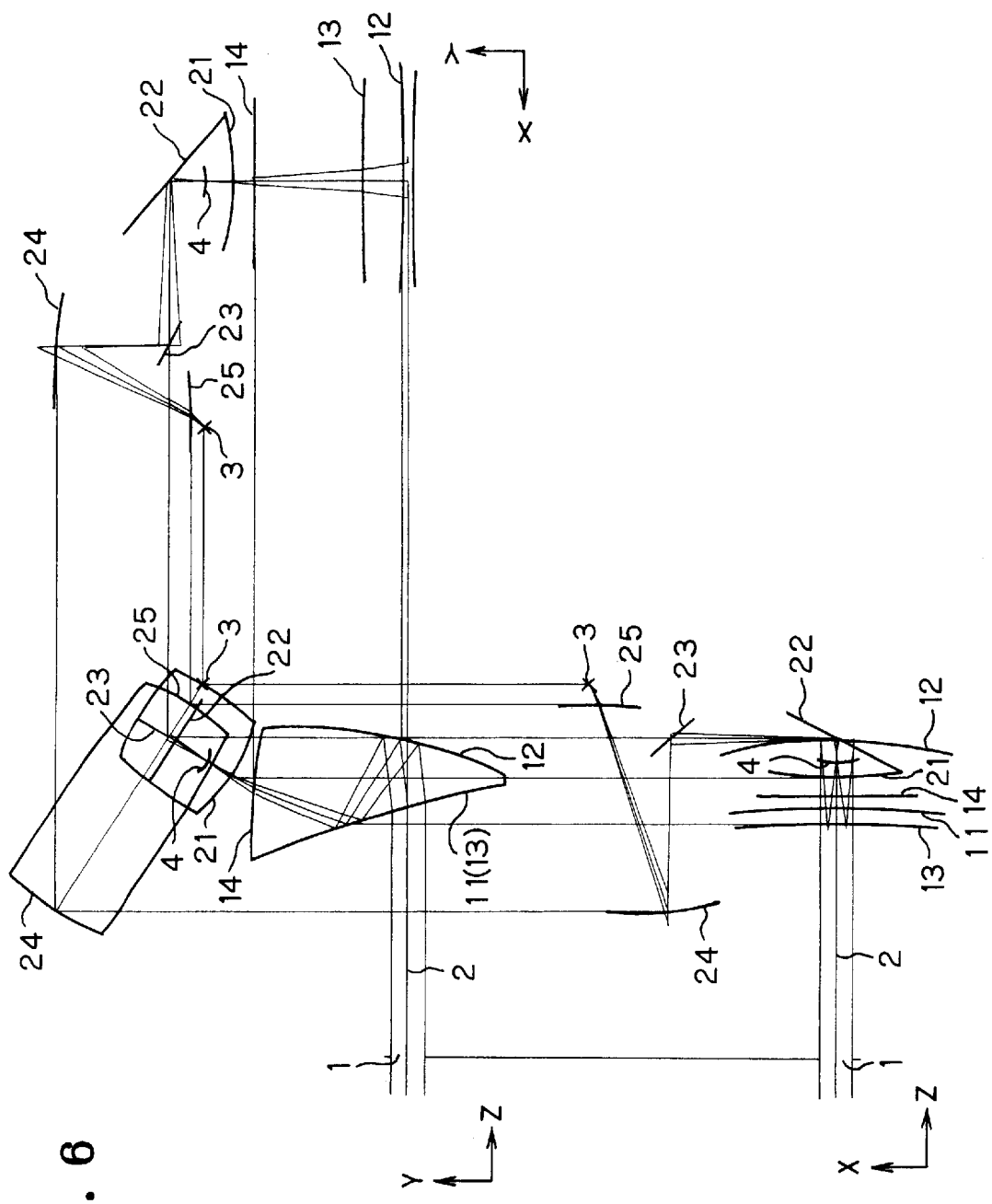
FIG. 6 is a three-plane view showing optical surfaces and principal rays in an optical system according to Example 2.

FIG. 6 is a three-plane view showing optical surfaces and principal rays in the optical system of an image display apparatus according to Example 2. This Example is approximately the same as Example 1. Example 2 differs from Example 1 as follows. In the backward ray tracing, the axial principal ray 2 is reflected toward the pupil 1 by the reflecting surface 23 of the optical path distributing prism 20 and then reflected away from the pupil 1 by the surface 24. Then, the axial principal ray 2 passes through the surface 25 and reaches the image display device 3 placed on the side of the optical path distributing prism 20 remote from the observer.

In this Example also, the optical system is decentered three dimensionally, thereby allowing the optical system to be folded in a desired direction. Accordingly, the whole image display apparatus can be constructed in a compact form. Thus, it is possible to provide an image display apparatus having a minimized dead space in consideration of other members. In addition, the degree of design freedom increases favorably.

In this Example also, decentration aberrations can be favorably corrected at a horizontal field angle of 35°.

Further, the axial principal ray 2 from the two-dimensionally decentered ocular prism 10 is three-dimensionally decentered by the reflecting surface 22 of the optical path distributing prism 20 so that the direction of decentration thereafter is perpendicular to the decentration direction of the ocular prism 10. Accordingly, the apparatus can be prevented from increasing in size. In addition, it becomes unnecessary to place the image display device 3 horizontally by rotating the reflecting surface 22 of the optical path distributing prism 20 about an axis parallel to the vertical direction (Y-axis). If the reflecting surface 22 is rotated through 45° as in this Example, the image display device 3 can be placed vertically. Accordingly, it is possible to prevent the image display apparatus from increasing in size in the horizontal direction. Further, even if the aspect ratio of the image display device 3 is set at 9:16, the overall size of the apparatus will not become very large.

EXAMPLE 3

Figure 7:
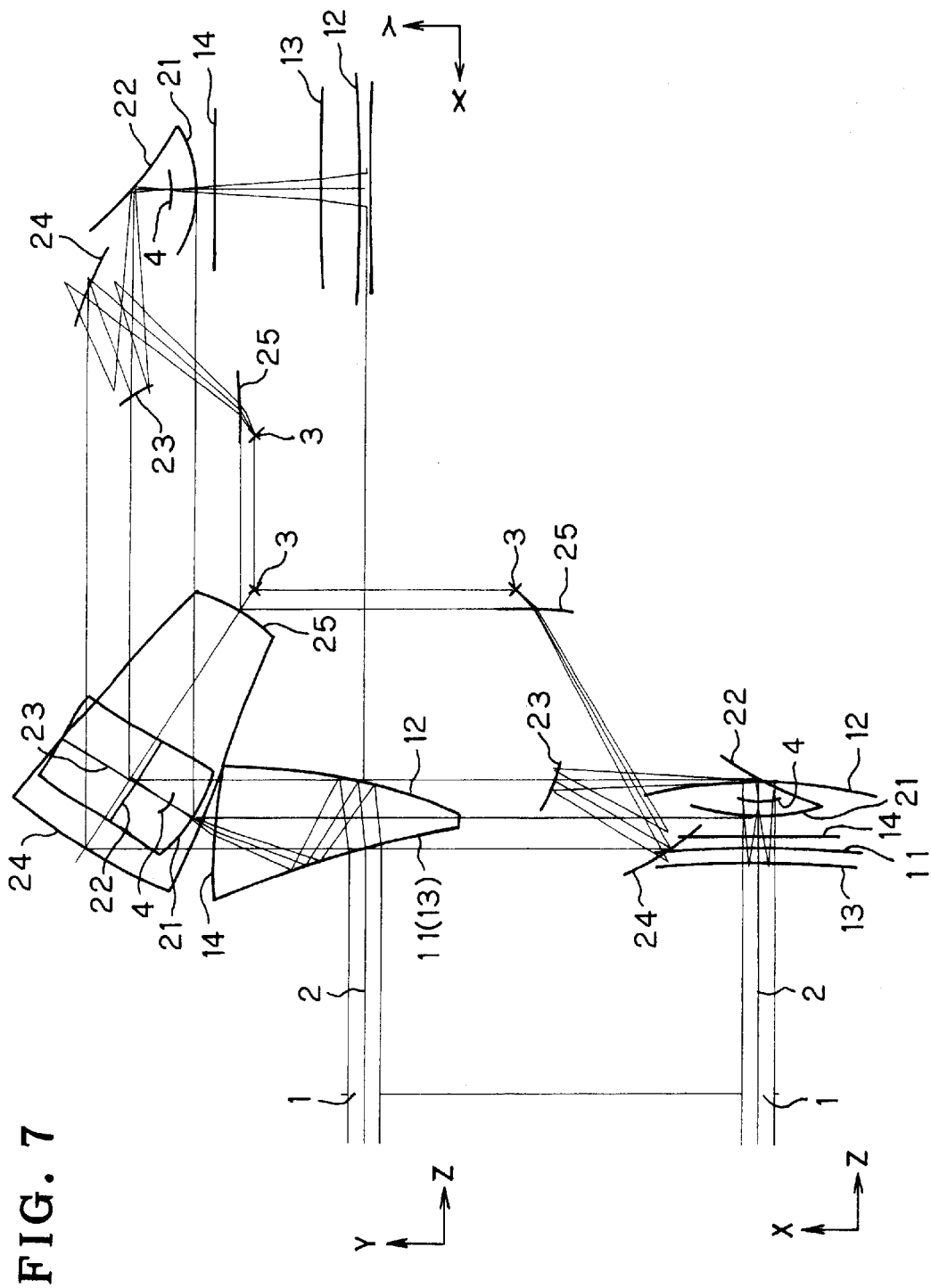
FIG. 7 is a three-plane view showing optical surfaces and principal rays in an optical system according to Example 3.

FIG. 7 is a three-plane view showing optical surfaces and principal rays in the optical system of an image display apparatus according to Example 3. This Example is approximately the same as Example 2. Example 3 differs from Example 2 as follows. In the backward ray tracing, the axial principal ray 2 is reflected acutely toward the pupil 1 by the reflecting surface 23 of the optical path distributing prism 20. Thus, the axial principal ray 2 crosses itself once in the optical path distributing prism 20 in the course of traveling from the surface 22 to the surface 25. The axial principal ray 2 passes through the surface 25 and reaches the image display device 3 placed on the side of the optical path distributing prism 20 remote from the observer.

In this Example also, the optical system is decentered three dimensionally, thereby allowing the optical system to be folded in a desired direction. Accordingly, the whole image display apparatus can be constructed in a compact form. Thus, it is possible to provide an image display apparatus having a minimized dead space in consideration of other members. In addition, the degree of design freedom increases favorably.

In this Example also, decentration aberrations can be favorably corrected at a horizontal field angle of 35°.

Further, the axial principal ray 2 from the two-dimensionally decentered ocular prism 10 is three-dimensionally decentered by the reflecting surface 22 of the optical path distributing prism 20 so that the direction of decentration thereafter is perpendicular to the decentration direction of the ocular prism 10. Accordingly, the apparatus can be prevented from increasing in size. In addition, it becomes unnecessary to place the image display device 3 horizontally by rotating the reflecting surface 22 of the optical path distributing prism 20 about an axis parallel to the vertical direction (Y-axis). If the reflecting surface 22 is rotated through 45° as in this Example, the image display device 3 can be placed vertically. Accordingly, it is possible to prevent the image display apparatus from increasing in size in the horizontal direction. Further, even if the aspect ratio of the image display device 3 is set at 9:16, the overall size of the apparatus will not become very large.

EXAMPLE 4

Figure 8:
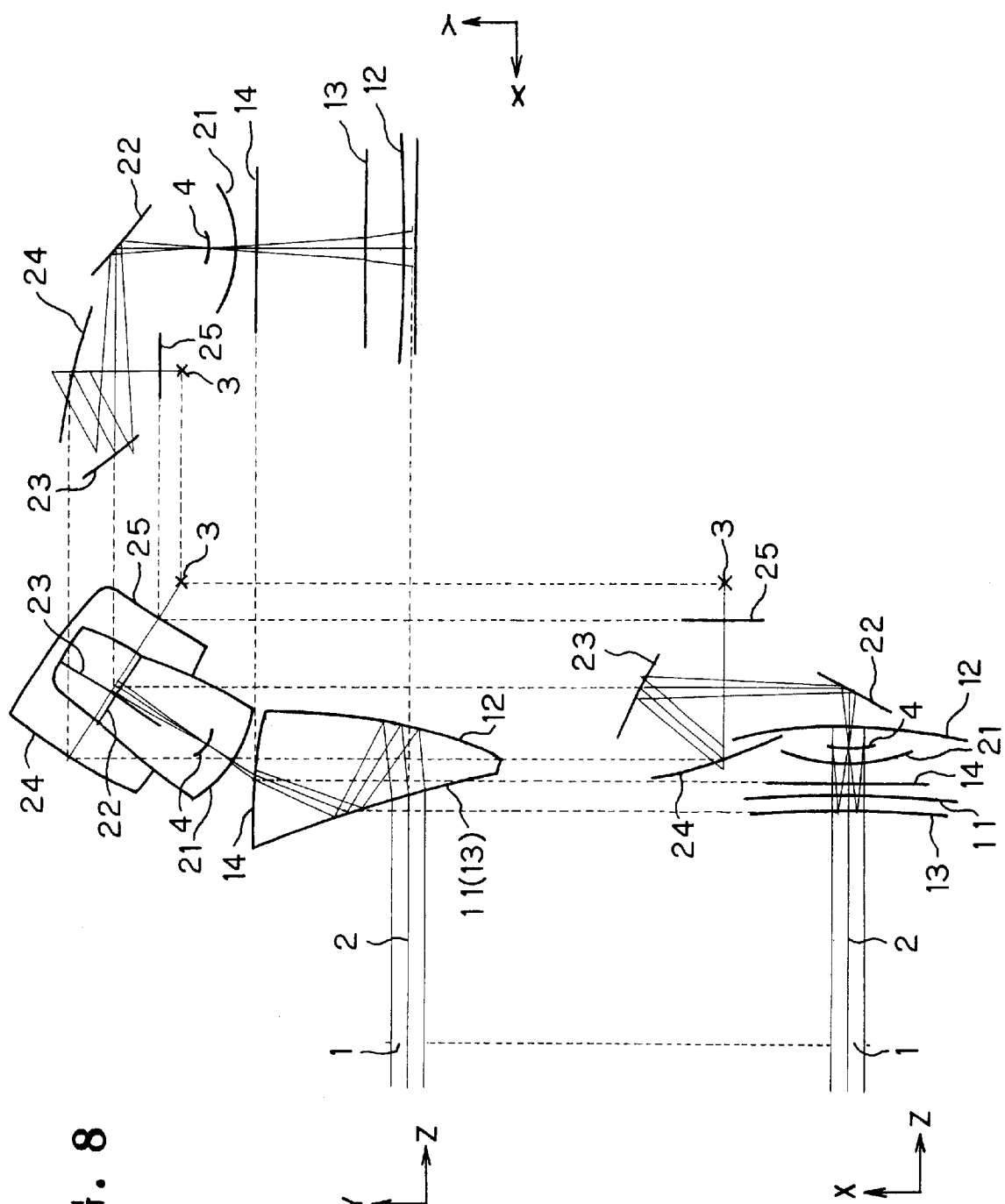
FIG. 8 is a three-plane view showing optical surfaces and principal rays in an optical system according to Example 4.

FIG. 8 is a three-plane view showing optical surfaces and principal rays in the optical system of an image display apparatus according to Example 4. This Example is approximately the same as Example 3. Example 4 differs from Example 3 in that the axial principal ray 2 is made incident on the image display device 3 approximately at right angles without considering the use of the image display device 3 in common to left and right eyes.

In this Example also, the optical system is decentered three dimensionally, thereby allowing the optical system to be folded in a desired direction. Accordingly, the whole image display apparatus can be constructed in a compact form. Thus, it is possible to provide an image display apparatus having a minimized dead space in consideration of other members. In addition, the degree of design freedom increases favorably.

In this Example also, decentration aberrations can be favorably corrected at a horizontal field angle of 35°.

Further, the axial principal ray 2 from the two-dimensionally decentered ocular prism 10 is three-dimensionally decentered by the reflecting surface 22 of the optical path distributing prism 20 so that the direction of decentration thereafter is perpendicular to the decentration direction of the ocular prism 10. Accordingly, the apparatus can be prevented from increasing in size. In addition, it becomes unnecessary to place the image display device 3 horizontally by rotating the reflecting surface 22 of the optical path distributing prism 20 about an axis parallel to the vertical direction (Y-axis). If the reflecting surface 22 is rotated through 45° as in this Example, the image display device 3 can be placed vertically. Accordingly, it is possible to prevent the image display apparatus from increasing in size in the horizontal direction. Further, even if the aspect ratio of the image display device 3 is set at 9:16, the overall size of the apparatus will not become very large.

Next, constituent parameters in the above-described Examples 1 to 4 will be shown. In the constituent parameters in each Example, the axial principal ray 2 is defined by a light ray passing perpendicularly through the center of the exit pupil 1 of the optical system and reaching the center of the image display device 3 in the backward ray tracing. Further, in the backward ray tracing, the center of the pupil 1 is defined as the origin of each decentered optical surface constituting a decentered optical system. The direction along which the axial principal ray 2 travels until it intersects the surface 11 of the ocular prism 10 is defined as a Z-axis. The direction in which the Z-axis extends from the pupil 1 toward the surface 11 is defined as a positive direction of the Z-axis. A plane in which the optical axis is folded in the ocular prism 10 is defined as a YZ-plane. An axis passing through the origin and perpendicularly intersecting the YZ-plane is defined as an X-axis. The direction in which the X-axis extends toward the image display device 3 is defined as a positive direction of the X-axis. An axis that constitutes a right-handed orthogonal coordinate system in combination with the X- and Z-axes is defined as a Y-axis. This coordinate system is coincident with those shown in FIGS. 5 to 8.

Regarding decentered surfaces, each surface is given displacements in the X-, Y- and Z-axis directions (X, Y and Z, respectively) of the vertex position of the surface from the origin of the optical system, and tilt angles (degrees) of the center axis of the surface [the Z-axis of the above equation ($a$) in regard to free-form surfaces; the Z-axis of the following equation (d) in the case of aspherical surfaces] with respect to the X-, Y- and Z-axes ($\alpha$, $\beta$ and $\gamma$, respectively). In this case, the positive $\alpha$ and $\beta$ mean counterclockwise rotation relative to the positive directions of the corresponding axes, and the positive $\gamma$ means clockwise rotation relative to the positive direction of the Z-axis. It should be noted that the way of rotating the center axis of each surface through $\alpha$, $\beta$ and $\gamma$ is as follows. First, the center axis of the surface and the XYZ orthogonal coordinate system are rotated through $\alpha$ counterclockwise about the X-axis. Then, the rotated center axis of the surface is rotated through $\beta$ counterclockwise about the Y-axis of the new coordinate system, and the coordinate system once rotated is also rotated through $\beta$ counterclockwise about the Y-axis. Then, the center axis of the surface, which has been rotated twice, is rotated through $\gamma$ clockwise about the Z-axis of the new coordinate system.

Among optical surfaces constituting the optical system in each Example, a specific surface and a surface subsequent thereto are given a surface separation when these surfaces form a coaxial optical system. In addition, the refractive index and Abbe's number of each medium are given according to the conventional method.

The configuration of each free-form surface used in the present invention is defined by the above equation (a). The Z-axis of the defining equation is the axis of the free-form surface.

Aspherical surfaces used in the present invention are rotationally symmetric aspherical surfaces given by the following equation:

$$Z=(y^2/R)/[1+\{1-(1+K)y^2/R^2\}^{1/2}]+Ay^4+By^6+Cy^8+Dy^{10}+ \quad (d)$$

In the above equation, Z is an optical axis (axial principal ray) for which the direction of travel of light is defined as a positive direction, and y is taken in a direction perpendicular to the optical axis. R is a paraxial curvature radius, and K is a conic constant. A, B, C, D . . . are 4th-, 6th-, 8th- and 10th-order aspherical coefficients, respectively. The Z-axis of this defining equation is the axis of the rotationally symmetric aspherical surface.

In the constituent parameters (shown later), those terms concerning free-form surfaces and aspherical surfaces for which no data is shown are zero. The refractive index is expressed by the refractive index for the spectral d-line (wavelength: 587.56 nanometers). Lengths are given in millimeters.

It should be noted that when Examples 1 to 4 are arranged in the form of a viewing optical system, the viewing field angles are as follows. The horizontal half field angle is 17.5°, and the vertical half field angle is 13.3°. The size of the image display device 3 is 8.9×6.7 millimeters. The pupil diameter is 4 millimeters.

It should be noted that in the tables below, "FFS" denotes a free-form surface, and "ASS" denotes an aspherical surface, and further "RE" denotes a reflecting surface.

Example 1

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Pupil) | | | | |
| 2 | ASS① | (1) | | 1.5254 | 56.2 |
| 3 | FFS① (RE) | (2) | | 1.5254 | 56.2 |
| 4 | ASS① (RE) | (1) | | 1.5254 | 56.2 |
| 5 | FFS② | (3) | | | |
| 6 | FFS③ | (4) | | 1.5254 | 56.2 |
| 7 | FFS④ (RE) | (5) | | 1.5254 | 56.2 |
| 8 | FFS⑤ (RE) | (6) | | 1.5254 | 56.2 |
| 9 | FFS⑥ (RE) | (7) | | 1.5254 | 56.2 |
| 10 | FFS⑦ | (8) | | | |
| Image plane | ∞ | (9) | | | |

ASS①
R   −165.42
K    0.0000
A   −5.2477 × $10^{-7}$
B    5.9890 × $10^{-10}$

FFS①
$C_4$  −9.0776 × $10^{-3}$   $C_6$  −8.8020 × $10^{-3}$   $C_8$  2.4862 × $10^{-5}$
$C_{10}$  4.5192 × $10^{-5}$   $C_{11}$  −1.1138 × $10^{-6}$   $C_{13}$  −2.2393 × $10^{-6}$
$C_{15}$  −1.4980 × $10^{-6}$   $C_{17}$  6.2564 × $10^{-9}$   $C_{19}$  7.3888 × $10^{-8}$
$C_{21}$  4.9912 × $10^{-8}$

FFS②
$C_4$  −2.5220 × $10^{-4}$   $C_6$  −5.6446 × $10^{-3}$   $C_8$  6.9828 × $10^{-5}$
$C_{10}$  −2.8905 × $10^{-5}$   $C_{11}$  7.7931 × $10^{-6}$   $C_{13}$  1.1521 × $10^{-5}$
$C_{17}$  5.3841 × $10^{-8}$   $C_{19}$  −2.0288 × $10^{-6}$

FFS③
$C_4$  1.9404 × $10^{-2}$   $C_6$  2.8879 × $10^{-2}$

FFS④
$C_4$  −1.9237 × $10^{-4}$   $C_6$  6.6626 × $10^{-4}$   $C_7$  5.5635 × $10^{-6}$
$C_9$  3.8912 × $10^{-5}$

FFS⑤
$C_4$  1.2672 × $10^{-4}$   $C_6$  2.9493 × $10^{-4}$   $C_7$  −1.2544 × $10^{-4}$
$C_9$  −2.5504 × $10^{-4}$

FFS⑥
$C_4$  −1.1656 × $10^{-2}$   $C_8$  −1.2010 × $10^{-2}$   $C_7$  −4.6164 × $10^{-6}$
$C_9$  4.9618 × $10^{-6}$

FFS⑦
$C_4$  −1.0509 × $10^{-2}$   $C_6$  −2.0232 × $10^{-2}$

Displacement and tilt(1)
X   0.00   Y   7.22   Z   27.80
α  18.61   β  0.00   γ   0.00

Displacement and tilt(2)
X   0.00   Y   0.84   Z   38.64
α −12.47   β  0.00   γ   0.00

Displacement and tilt(3)
X   0.00   Y  18.30   Z   32.34
α  85.56   β  0.00   γ   0.00

Displacement and tilt(4)
X   0.00   Y  20.84   Z   33.94
α  57.70   β  0.00   γ   0.00

Displacement and tilt(5)
X   0.00   Y  28.44   Z   38.75
α  57.70   β 45.00   γ   0.00

Displacement and tilt(6)
X  20.00   Y  28.44   Z   38.75
α 147.70   β −43.21   γ   0.00

Displacement and tilt(7)
X  21.56   Y  15.08   Z   59.88
α −32.30   β  4.99   γ 180.00

Displacement and tilt(8)
X  30.00   Y  31.11   Z   34.52
α 147.70   β  0.00   γ   0.00

Displacement and tilt(9)
X  30.00   Y  32.72   Z   31.99
α 147.70   β  0.00   γ   0.00

Example 2

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Pupil) | | | | |
| 2 | ASS① | (1) | | 1.5254 | 56.2 |
| 3 | FFS① (RE) | (2) | | 1.5254 | 56.2 |
| 4 | ASS① (RE) | (1) | | 1.5254 | 56.2 |
| 5 | FFS② | (3) | | | |
| 6 | FFS③ | (4) | | 1.5254 | 56.2 |
| 7 | FFS④ (RE) | (5) | | 1.5254 | 56.2 |
| 8 | FFS⑤ (RE) | (6) | | 1.5254 | 56.2 |
| 9 | FFS⑥ (RE) | (7) | | 1.5254 | 56.2 |
| 10 | FFS⑦ | (8) | | | |
| Image plane | ∞ | (9) | | | |

ASS①
R   −165.42
K    0.0000
A   −5.2477 × $10^{-7}$
B    5.9890 × $10^{-10}$

FFS①
$C_4$  −9.0776 × $10^{-3}$   $C_6$  −8.8020 × $10^{-3}$   $C_8$  2.4862 × $10^{-5}$
$C_{10}$  4.5192 × $10^{-5}$   $C_{11}$  −1.1138 × $10^{-6}$   $C_{13}$  −2.2393 × $10^{-6}$
$C_{15}$  −1.4980 × $10^{-6}$   $C_{17}$  6.2564 × $10^{-9}$   $C_{19}$  7.3888 × $10^{-8}$
$C_{21}$  4.9912 × $10^{-8}$

FFS②
$C_4$  −2.5220 × $10^{-4}$   $C_6$  −5.6446 × $10^{-3}$   $C_8$  6.9828 × $10^{-5}$
$C_{10}$  −2.8905 × $10^{-5}$   $C_{11}$  7.7931 × $10^{-6}$   $C_{13}$  1.1521 × $10^{-5}$
$C_{17}$  5.3841 × $10^{-8}$   $C_{19}$  2.0288 × $10^{-6}$

FFS③
$C_4$  1.8574 × $10^{-2}$   $C_6$  2.7107 × $10^{-2}$

FFS④
$C_4$  −3.1131 × $10^{-4}$   $C_6$  1.9910 × $10^{-5}$   $C_7$  3.9534 × $10^{-6}$
$C_9$  1.3662 × $10^{-5}$

FFS⑤
$C_4$  −6.9549 × $10^{-4}$   $C_6$  −5.3847 × $10^{-4}$   $C_7$  9.1762 × $10^{-5}$
$C_9$  1.5719 × $10^{-4}$

FFS⑥
$C_4$  −1.1770 × $10^{-2}$   $C_6$  −1.1966 × $10^{-2}$   $C_7$  −8.6154 × $10^{-6}$
$C_9$  −1.2036 × $10^{-5}$

FFS⑦
$C_4$  9.2318 × $10^{-3}$   $C_6$  2.0037 × $10^{-2}$

Displacement and tilt(1)
X   0.00   Y   7.22   Z   27.80
α  18.61   β  0.00   γ   0.00

Displacement and tilt(2)
X   0.00   Y   0.84   Z   38.64
α −12.47   β  0.00   γ   0.00

Displacement and tilt(3)
X   0.00   Y  18.30   Z   32.34
α  85.56   β  0.00   γ   0.00

Displacement and tilt(4)
X   0.00   Y  20.84   Z   33.94
α  57.70   β  0.00   γ   0.00

Displacement and tilt(5)
X   0.00   Y  28.44   Z   38.75
α  57.70   β 45.00   γ   0.00

-continued

|  |  |  |  |  |  |
|---|---|---|---|---|---|
| Displacement and tilt(6) | | | | | |
| X | 20.00 | Y | 28.44 | Z | 38.75 |
| α | 147.70 | β | 44.69 | γ | 0.00 |
| Displacement and tilt(7) | | | | | |
| X | 20.27 | Y | 41.80 | Z | 17.62 |
| α | 147.70 | β | 7.45 | γ | 0.00 |
| Displacement and tilt(8) | | | | | |
| X | 30.00 | Y | 25.77 | Z | 42.98 |
| α | 147.70 | β | 0.00 | γ | 0.00 |
| Displacement and tilt(9) | | | | | |
| X | 30.00 | Y | 24.17 | Z | 45.51 |
| α | 147.70 | β | 0.00 | γ | 0.00 |

Example 3

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞(Pupil) | | | | |
| 2 | ASS① | (1) | | 1.5254 | 56.2 |
| 3 | FFS① (RE) | (2) | | 1.5254 | 56.2 |
| 4 | ASS① (RE) | (1) | | 1.5254 | 56.2 |
| 5 | FFS② | (3) | | | |
| 6 | FFS③ | (4) | | 1.5254 | 56.2 |
| 7 | FFS④ (RE) | (5) | | 1.5254 | 56.2 |
| 8 | FFS⑤ (RE) | (6) | | 1.5254 | 56.2 |
| 9 | FFS⑥ (RE) | (7) | | 1.5254 | 56.2 |
| 10 | FFS⑦ | (8) | | | |
| Image plane | ∞ | (9) | | | |

ASS①
R     −165.42
K     0.0000
A     −5.2477 × $10^{-7}$
B     5.9890 × $10^{-10}$

FFS①
$C_4$  −9.0776 × $10^{-3}$  $C_6$  −8.8020 × $10^{-3}$  $C_8$  2.4862 × $10^{-5}$
$C_{10}$  4.5192 × $10^{-5}$  $C_{11}$  −1.1138 × $10^{-6}$  $C_{13}$  −2.2393 × $10^{-6}$
$C_{15}$  −1.4980 × $10^{-6}$  $C_{17}$  6.2564 × $10^{-9}$  $C_{19}$  7.3888 × $10^{-8}$
$C_{21}$  4.9912 × $10^{-8}$

FFS②
$C_4$  −2.5220 × $10^{-4}$  $C_6$  −5.6446 × $10^{-3}$  $C_8$  6.9828 × $10^{-5}$
$C_{10}$  −2.8905 × $10^{-5}$  $C_{11}$  7.7931 × $10^{-6}$  $C_{13}$  1.1521 × $10^{-5}$
$C_{17}$  −5.3841 × $10^{-8}$  $C_{19}$  −2.0288 × $10^{-6}$

FFS③
$C_4$  4.1926 × $10^{-2}$  $C_6$  2.4498 × $10^{-2}$

FFS④
$C_4$  1.2182 × $10^{-2}$  $C_6$  2.6939 × $10^{-3}$  $C_7$  1.5885 × $10^{-4}$
$C_9$  6.9043 × $10^{-5}$

FFS⑤
$C_4$  −1.0824 × $10^{-2}$  $C_6$  2.5126 × $10^{-3}$  $C_7$  −9.9163 × $10^{-5}$
$C_9$  −3.4184 × $10^{-4}$

FFS⑥
$C_4$  −1.2852 × $10^{-2}$  $C_6$  −9.8242 × $10^{-3}$  $C_7$  −1.1759 × $10^{-4}$
$C_9$  −9.9024 × $10^{-5}$

FFS⑦
$C_4$  6.4080 × $10^{-3}$  $C_6$  2.8176 × $10^{-2}$

|  |  |  |  |  |  |
|---|---|---|---|---|---|
| Displacement and tilt(1) | | | | | |
| X | 0.00 | Y | 7.22 | Z | 27.80 |
| α | 18.61 | β | 0.00 | γ | 0.00 |
| Displacement and tilt(2) | | | | | |
| X | 0.00 | Y | 0.84 | Z | 38.64 |
| α | −12.47 | β | 0.00 | γ | 0.00 |
| Displacement and tilt(3) | | | | | |
| X | 0.00 | Y | 18.30 | Z | 32.34 |
| α | 85.56 | β | 0.00 | γ | 0.00 |
| Displacement and tilt(4) | | | | | |
| X | 0.00 | Y | 20.84 | Z | 33.94 |
| α | 57.70 | β | 0.00 | γ | 0.00 |
| Displacement and tilt(5) | | | | | |
| X | 0.00 | Y | 28.44 | Z | 38.75 |
| α | 57.70 | β | 45.00 | γ | 0.00 |

-continued

|  |  |  |  |  |  |
|---|---|---|---|---|---|
| Displacement and tilt(6) | | | | | |
| X | 25.00 | Y | 28.44 | Z | 38.75 |
| α | 147.70 | β | 72.41 | γ | 0.00 |
| Displacement and tilt(7) | | | | | |
| X | 10.81 | Y | 33.79 | Z | 30.30 |
| α | 147.70 | β | 40.00 | γ | 0.00 |
| Displacement and tilt(8) | | | | | |
| X | 30.00 | Y | 15.08 | Z | 59.88 |
| α | 147.70 | β | 0.00 | γ | 0.00 |
| Displacement and tilt(9) | | | | | |
| X | 30.00 | Y | 13.48 | Z | 62.42 |
| α | 147.70 | β | 0.00 | γ | 0.00 |

Example 4

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞(Pupil) | | | | |
| 2 | ASS① | (1) | | 1.5254 | 56.2 |
| 3 | FFS① (RE) | (2) | | 1.5254 | 56.2 |
| 4 | ASS① (RE) | (1) | | 1.5254 | 56.2 |
| 5 | FFS② | (3) | | | |
| 6 | FFS③ | (4) | | 1.5254 | 56.2 |
| 7 | FFS④ (RE) | (5) | | 1.5254 | 56.2 |
| 8 | FFS⑤ (RE) | (6) | | 1.5254 | 56.2 |
| 9 | FFS⑥ (RE) | (7) | | 1.5254 | 56.2 |
| 10 | ∞ | (8) | | | |
| Image plane | ∞ | (9) | | | |

ASS①
R     −165.42
K     0.0000
A     −5.2477 × $10^{-7}$
B     5.9890 × $10^{-10}$

FFS①
$C_4$  −9.0776 × $10^{-3}$  $C_6$  −8.8020 × $10^{-3}$  $C_8$  2.4862 × $10^{-5}$
$C_{10}$  4.5192 × $10^{-5}$  $C_{11}$  −1.1138 × $10^{-6}$  $C_{13}$  −2.2393 × $10^{-6}$
$C_{15}$  1.4980 × $10^{-6}$  $C_{17}$  6.2564 × $10^{-9}$  $C_{19}$  7.3888 × $10^{-8}$
$C_{21}$  4.9912 × $10^{-8}$

FFS②
$C_4$  −2.5220 × $10^{-4}$  $C_6$  −5.6446 × $10^{-3}$  $C_8$  6.9828 × $10^{-5}$
$C_{10}$  −2.8905 × $10^{-5}$  $C_{11}$  7.7931 × $10^{-6}$  $C_{13}$  1.1521 × $10^{-5}$
$C_{17}$  −5.3841 × $10^{-8}$  $C_{19}$  −2.0288 × $10^{-6}$

FFS③
$C_4$  4.3746 × $10^{-2}$  $C_6$  3.9203 × $10^{-2}$

FFS④
$C_4$  1.7882 × $10^{-3}$  $C_6$  3.0819 × $10^{-4}$  $C_7$  −2.3425 × $10^{-5}$
$C_9$  8.8797 × $10^{-5}$

FFS⑤
$C_4$  5.3505 × $10^{-3}$  $C_6$  7.7642 × $10^{-3}$  $C_7$  −9.6307 × $10^{-5}$
$C_9$  −1.0487 × $10^{-4}$

FFS⑥
$C_4$  −8.9977 × $10^{-3}$  $C_6$  −9.1781 × $10^{-3}$  $C_7$  −4.6595 × $10^{-6}$
$C_9$  6.2228 × $10^{-6}$

|  |  |  |  |  |  |
|---|---|---|---|---|---|
| Displacement and tilt(1) | | | | | |
| X | 0.00 | Y | 7.22 | Z | 27.80 |
| α | 18.61 | β | 0.00 | γ | 0.00 |
| Displacement and tilt(2) | | | | | |
| X | 0.00 | Y | 0.84 | Z | 38.64 |
| α | −12.47 | β | 0.00 | γ | 0.00 |
| Displacement and tilt(3) | | | | | |
| X | 0.00 | Y | 18.30 | Z | 32.34 |
| α | 85.56 | β | 0.00 | γ | 0.00 |
| Displacement and tilt(4) | | | | | |
| X | 0.00 | Y | 20.84 | Z | 33.94 |
| α | 57.70 | β | 0.00 | γ | 0.00 |
| Displacement and tilt(5) | | | | | |
| X | 0.00 | Y | 35.20 | Z | 43.02 |
| α | 57.70 | β | 45.00 | γ | 0.00 |

-continued

|  | Displacement and tilt(6) |  |  |  |  |
|---|---|---|---|---|---|
| X | 25.00 | Y | 35.20 | Z | 43.02 |
| α | 147.70 | β | 67.50 | γ | 0.00 |
|  | Displacement and tilt(7) |  |  |  |  |
| X | 15.00 | Y | 40.55 | Z | 34.57 |
| α | 147.70 | β | 22.50 | γ | 0.00 |
|  | Displacement and tilt(8) |  |  |  |  |
| X | 15.00 | Y | 29.86 | Z | 51.48 |
| α | 147.70 | β | 0.00 | γ | 0.00 |
|  | Displacement and tilt(9) |  |  |  |  |
| X | 15.00 | Y | 27.19 | Z | 55.70 |
| α | 147.70 | β | 0.00 | γ | 0.00 |

Figure 9:
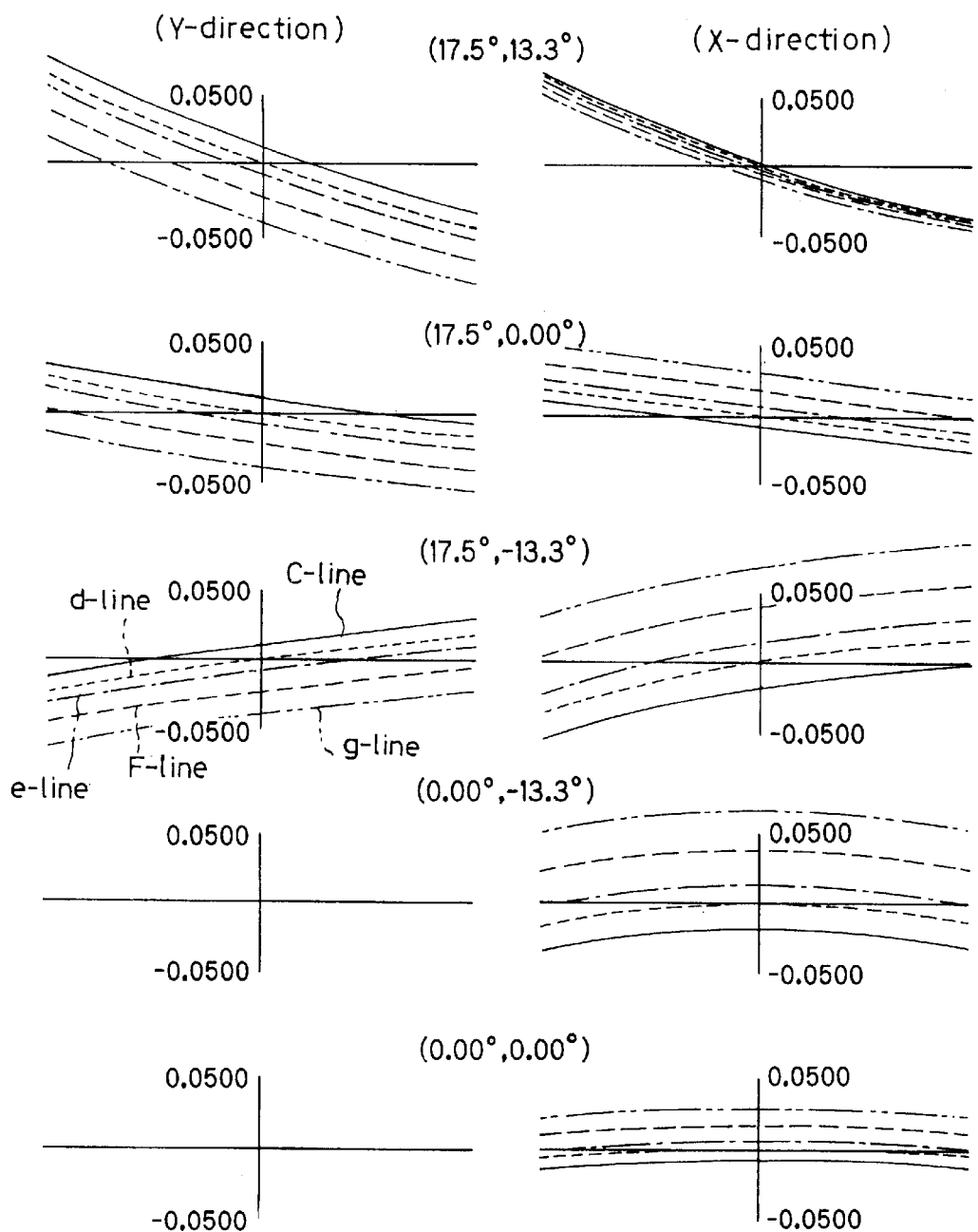
FIG. 9 is a part of an aberrational diagram illustrating lateral aberrations in the optical system according to Example 1.
Figure 10:
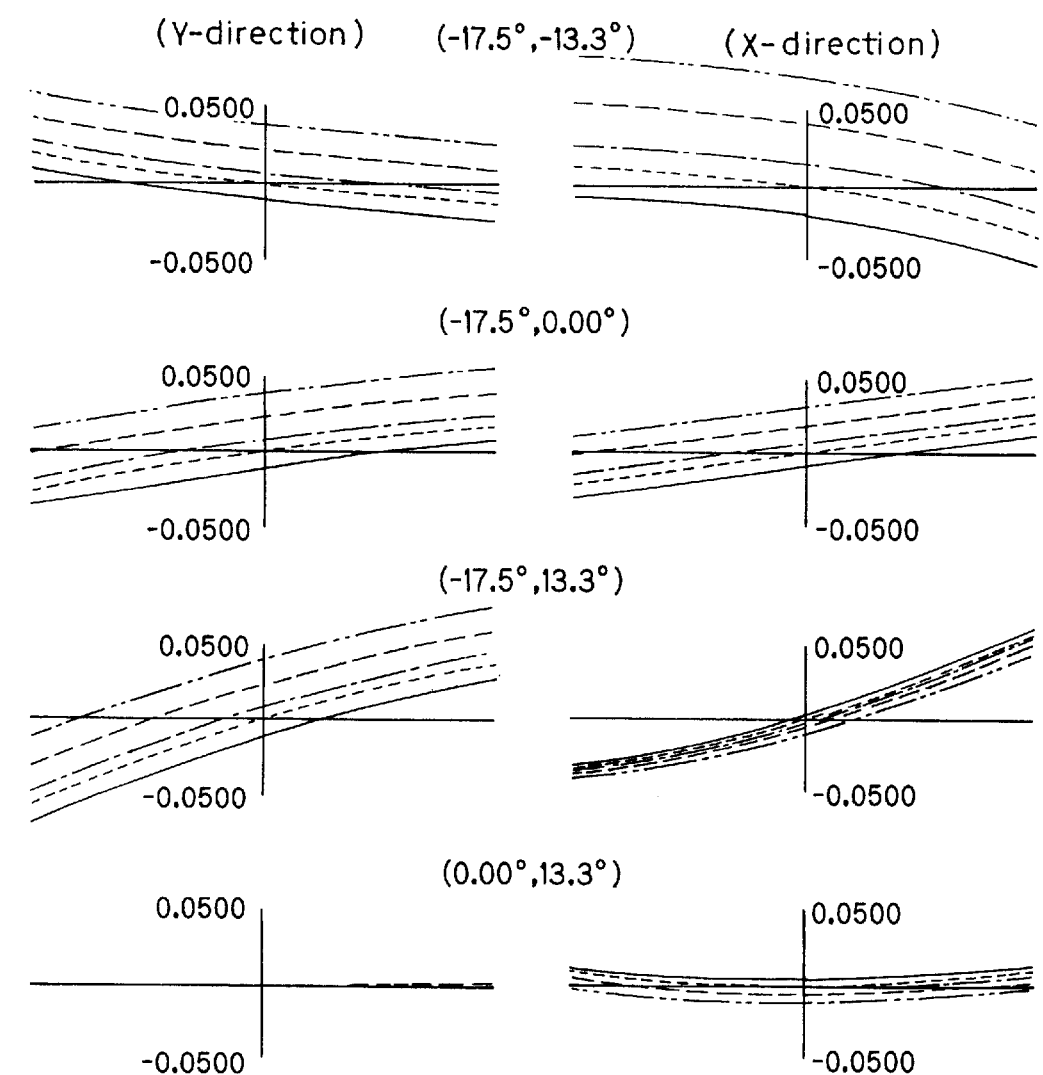
FIG. 10 is the other part of the aberrational diagram illustrating lateral aberrations in the optical system according to Example 1.

FIGS. 9 and 10 are aberrational diagrams showing lateral aberrations in the above-described Example 1. In the diagrams showing lateral aberrations, the numerals in the parentheses denote (horizontal field angle, vertical field angle), and lateral aberrations at the field angles are shown.

Figures 11A, 11B:
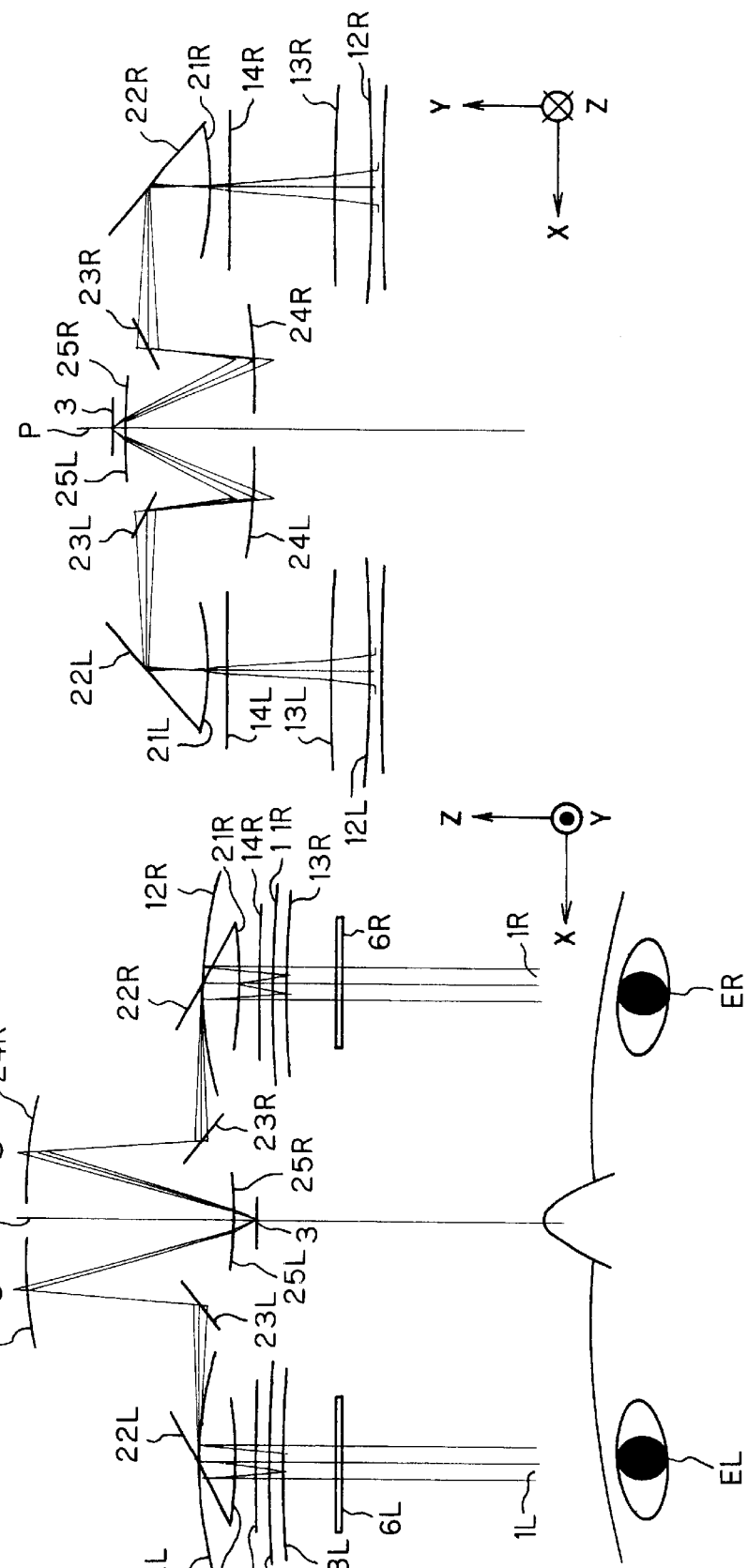
FIG. 11($a$) is a plan view showing only optical surfaces an principal rays as seen from above in the optical system according to Example 1 as arranged in the form of a head-mounted image display apparatus allowing observation with two eyes.

In the foregoing Examples 1 to 3, it is possible to construct an inexpensive head-mounted image display apparatus allowing observation of a single image display device 3 with both left and right eyes EL and ER by arranging left and right optical systems in bilateral symmetry with respect to a plane P, as shown in FIGS. 11(a) and 11(b), which passes through the center of the image surface of the image display device 3 at right angles thereto and extends in the longitudinal direction of the image surface. It should be noted that FIGS. 11(a) and 11(b) show the optical system of Example 1 as arranged in the form of a head-mounted image display apparatus allowing observation with both eyes. FIG. 11(a) is a plan view showing only the optical surfaces and the principal rays as viewed from above an observer fitted with the image display apparatus. FIG. 11(b) is a front view showing the optical surfaces and the principal rays as seen from the observer's side. In the figures, L and R are suffixed to reference symbols denoting the surfaces and the pupils to distinguish the left and right optical systems from each other.

It should be noted that in these Examples the images of the image display device 3 that are displayed in the left and right eyes EL and ER are in 180° rotated relation to each other. Therefore, it is necessary to arrange the system so that a display image for the right eye and a display image for the left eye are alternately displayed on the image display device 3, and when the image for the right eye is displayed, the displayed image reaches only the right eye ER, whereas when the image for the left eye is displayed, the displayed image reaches only the left eye EL. That is, when the image display device 3 is a reflection type image display device such as a reflection type liquid crystal display device, as shown in FIG. 11(a) by way of example, a small hole is provided in the reflecting surface 24R of the optical system for the right eye, and an illuminating light source 5L for the left eye is positioned to face the hole. Similarly, a small hole is provided in the reflecting surface 24L of the optical system for the left eye, and an illuminating light source 5R for the right eye is positioned to face the hole. When a display image for the right eye is displayed on the image display device 3, the illuminating light source 5R for the right eye is turned on, whereas when a display image for the left eye is displayed on the image display device 3, the illuminating light source 5L for the left eye is turned on, whereby the images displayed on the image display device 3 are alternately distributed to the left and right eyes EL and ER. Alternatively, optical shutters 6L and 6R may be placed between the left and right optical systems on the one hand and the left and right pupils 1L and 1R on the other. In this case, when a display image for the right eye is displayed on the image display device 3, the optical shutter 6R for the right eye is opened, whereas when a display image for the left eye is displayed on the image display device 3, the optical shutter 6L for the left eye is opened, whereby the images displayed on the image display device 3 are alternately distributed to the left and right eyes EL and ER.

Figure 12:
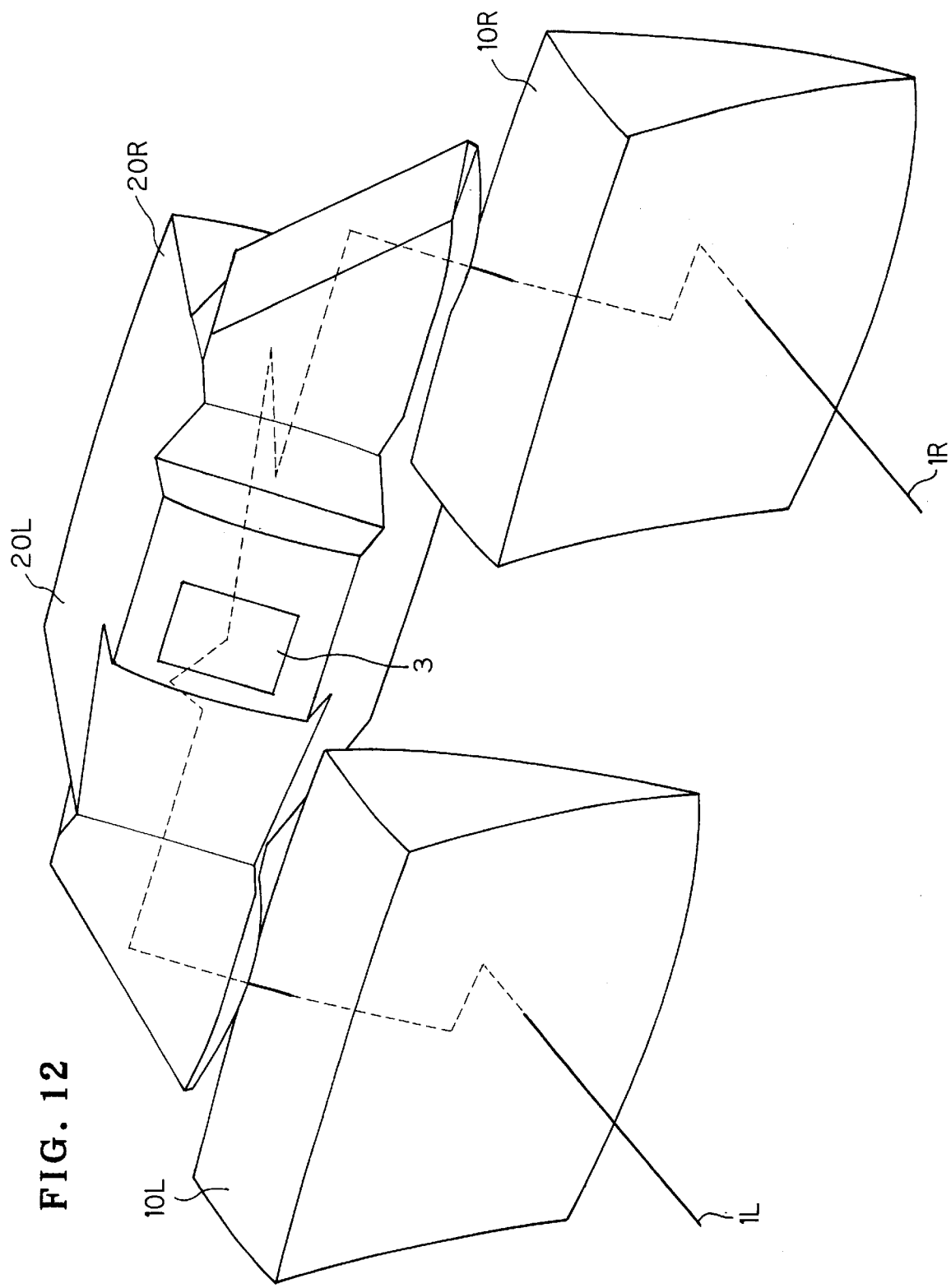
FIG. 12 is a perspective view showing the optical system of the head-mounted image display apparatus allowing observation with two eyes shown in FIGS. 11($a$) and 11($b$).

FIG. 12 is a perspective view showing the left and right optical systems of the head-mounted image display apparatus allowing observation with both eyes shown in FIGS. 11(a) and 11(b). In the figure, the ocular prisms of the left and right optical systems are denoted by reference symbols 10L and 10R, respectively, and the left and right optical path distributing prisms are denoted by reference symbols 20L and 20R, respectively. As will be clear from the figure, the left and right optical path distributing prisms 20L and 20R are integrated into a single prism member.

In Example 4, the angle of inclination of the principal rays incident on the image display device 3 is very small. Therefore, even an image display device having a small viewing angle, such as a liquid crystal display device, is usable. However, Example 4 does not take into consideration the scheme of allowing observation of a single image display device 3 with both eyes as in Examples 1 to 3.

Incidentally, an image display apparatus for a single eye can be formed by preparing one set of optical system components arranged as stated above. It is also possible to form an image display apparatus for two eyes by supporting two sets of such optical system components in bilateral symmetry with each other as stated above. In this way, it is possible to form a stationary or portable image display apparatus that allows observation with a single eye or two eyes.

Figure 13:
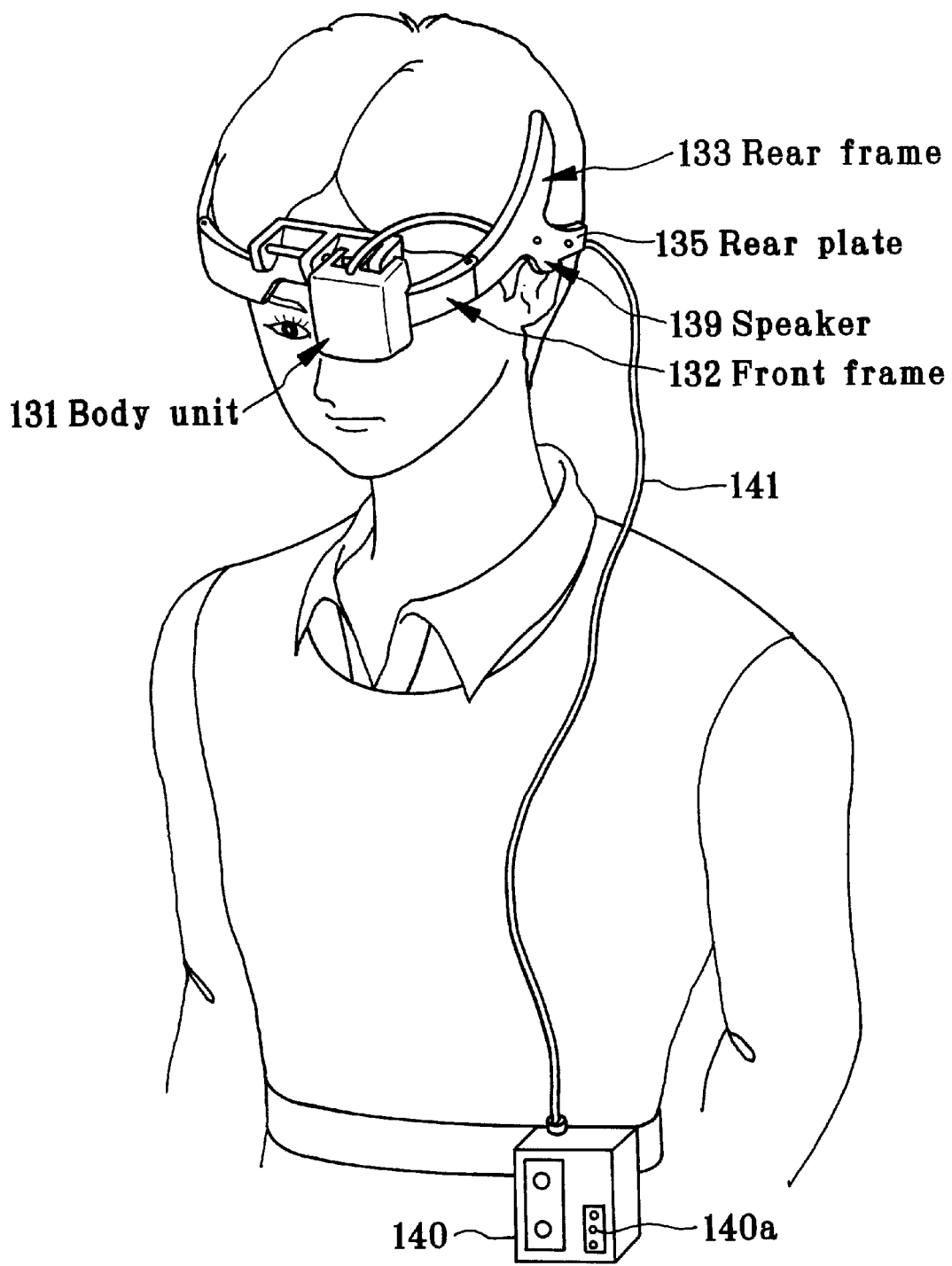
FIG. 13 is a diagram showing the arrangement of the image display apparatus according to the present invention as designed to be fitted for a single eye.
Figure 14:
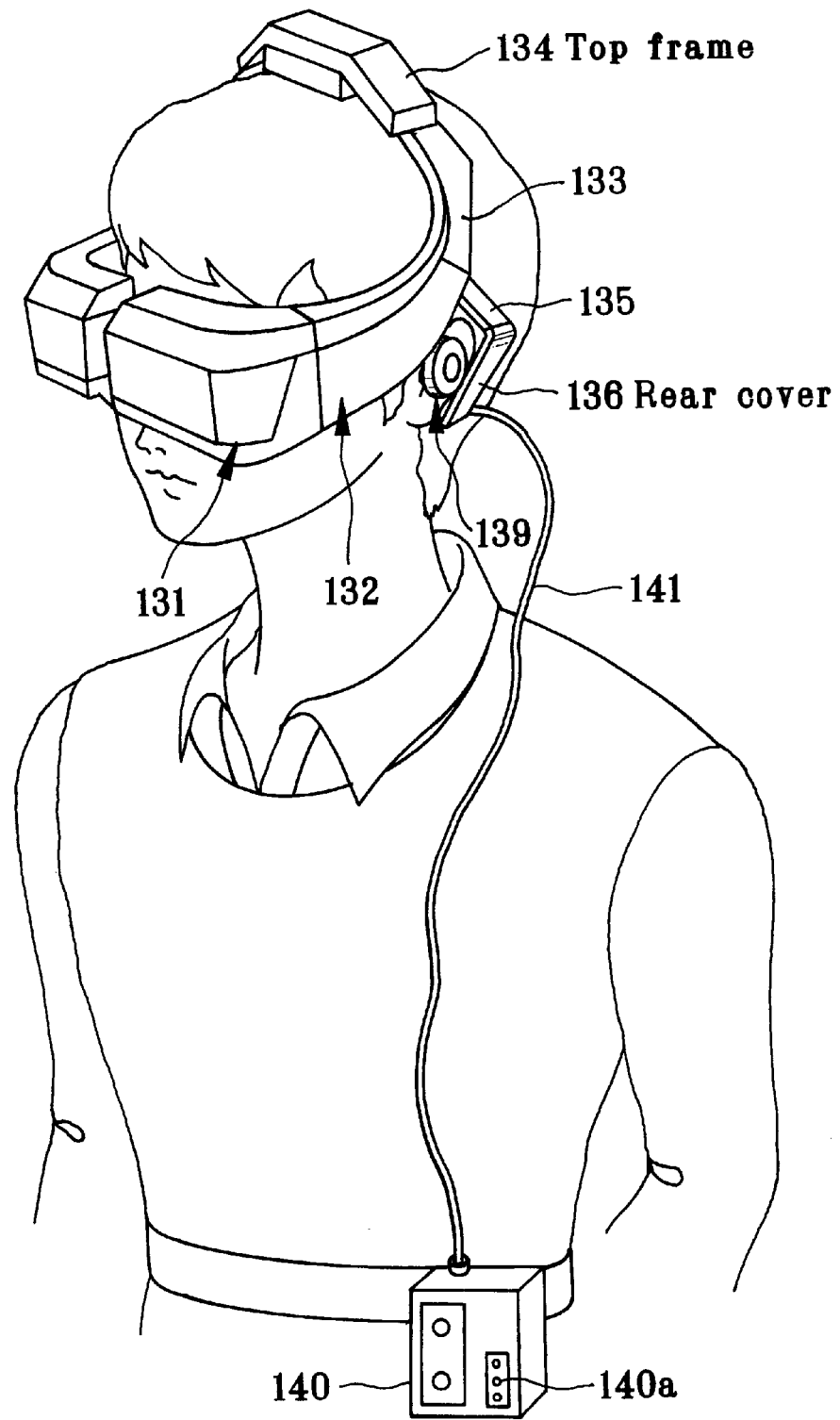
FIG. 14 is a diagram showing the arrangement of the image display apparatus according to the present invention as designed to be fitted for both eyes.

FIG. 13 shows the arrangement of an image display apparatus designed to be fitted for a single eye (in this case, the apparatus is fitted for the left eye). FIG. 14 shows the arrangement of an image display apparatus designed to be fitted for two eyes. In FIGS. 13 and 14, reference numeral 131 denotes a display apparatus body unit. In the case of FIG. 13, the display apparatus body unit 131 is fixed by a support member through the observer's head such that the display apparatus body unit 131 is held in front of the observer's left eye. In the case of FIG. 14, the display apparatus body unit 131 is fixed by a support member through the observer's head such that the display apparatus body unit 31 is held in front of both the observer's eyes. The support member for the display apparatus body unit 131 has a pair of front frames 132 (left and right) each joined at one end thereof to the display apparatus body unit 131. The left and right front frames 132 extend from the observer's temples to the upper portions of his/her ears, respectively. A pair of rear frames 133 (left and right) are joined to the other ends of the left and right front frames 132, respectively, and extend over the left and right side portions of the observer's head. In the case of FIG. 14, the support member further has a top frame 134 joined at both ends thereof to the other ends of the left and right rear frames 133, respectively, such that the top frame 134 lies over the top of the observer's head.

A rear plate 135 is joined to one front frame 132 near the joint to the rear frame 133. The rear plate 135 is formed from an elastic member, e.g. a metal leaf spring. In the case of FIG. 14, a rear cover 136, which forms a part of the support member, is joined to the rear plate 135 such that the rear cover 136 can support the apparatus at a position behind the observer's ear in a region extending from the back part of the head to the base of the neck. A speaker 139 is mounted inside the rear plate 135 or the rear cover 136 at a position corresponding to the observer's ear.

A cable 141 for transmitting external image and sound signals is led out from the display apparatus body unit 131. In the case of FIG. 14, the cable 141 extends through the top frame 134, the rear frames 133, the front frames 132 and the rear plate 135 and projects to the outside from the rear end of the rear cover 136. In the case of FIG. 13, the cable 141 projects from the rear end of the rear plate 135. The cable 141 is connected to a video-replaying unit 140. It should be noted that reference numeral 140a in the figures denotes a switch and volume control part of the video-replaying unit 140.

The cable 141 may have a jack and plug arrangement attached to the distal end thereof so that the cable 141 can be detachably connected to an existing video deck or the like. The cable 141 may also be connected to a TV signal receiving tuner so as to enable the user to enjoy watching TV. Alternatively, the cable 141 may be connected to a computer to receive computer graphic images or message images or the like from the computer. To eliminate the bothersome cord, the head-mounted image display apparatus may be arranged to receive external radio signals through an antenna connected thereto.

Figure 15:
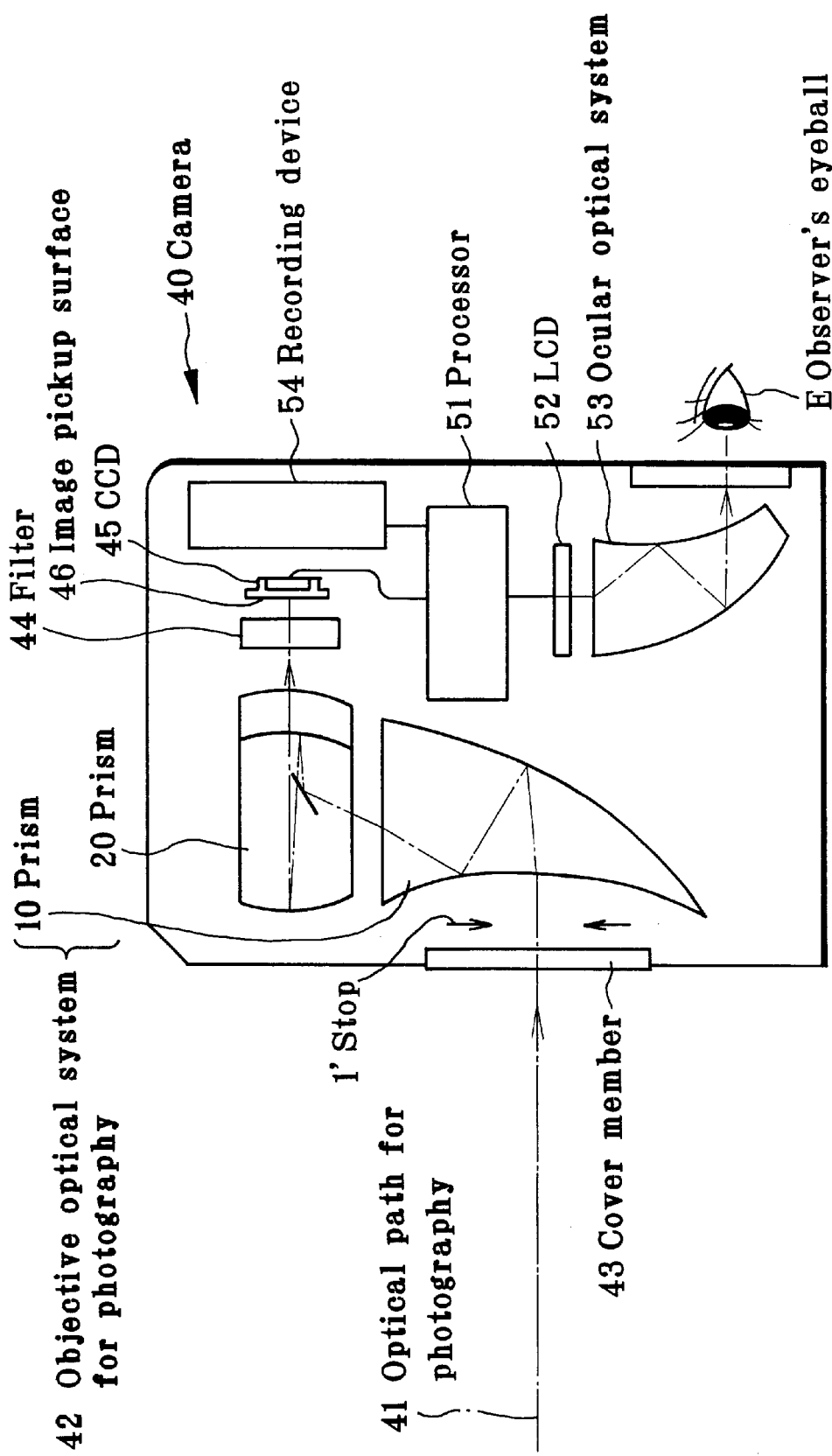
FIG. 15 is a schematic view showing an arrangement in which the optical system according to the present invention is incorporated in an objective optical system for photography in a photography part of an electronic camera.

The optical system of the image display apparatus according to the present invention is also usable as an image-forming optical system by introducing light from a subject from the pupil 1 side and placing an image pickup device at the position of the image display device 3. FIG. 15 is a schematic view showing an arrangement in which the optical system according to the present invention is incorporated into an objective optical system 42 of a photography part of an electronic camera 40. In this example, the objective optical system 42 for photography placed in an optical path 41 for photography uses an optical system similar to Example 2 except that the optical path is reverse to that in Example 2. A stop 1' is placed at the position of the pupil 1. An object image produced by the objective optical system 42 for photography is formed on an image pickup surface 46 of a CCD 45 through a filter 44, e.g. a low-pass filter or an infrared cutoff filter. The object image received by the CCD 45 is processed in a processor 51 and displayed in the form of an electronic image on a liquid crystal display device (LCD) 52. The processor 51 also controls a recording device 54 for recording the object image detected by the CCD 45 in the form of electronic information. The image displayed on the LCD 52 is led to an observer's eyeball E through an ocular optical system 53. The ocular optical system 53 is formed from a decentered prism similar to the ocular prism 10. As the ocular optical system 53, it is also possible to use a three-dimensionally decentered optical system including the ocular prism 10 and the optical path distributing prism 20 according to the present invention. It should be noted that the objective optical system 42 for photography may include another lens (a positive lens or a negative lens) as a constituent element on the object side of the prism 10 or on the image side of the prism 20.

In the camera 40 arranged as stated above, the objective optical system 42 for photography can be constructed with a minimal number of optical members. Accordingly, the whole apparatus can be constructed in a compact form. Further, it is possible to provide a camera having a minimized dead space in consideration of other associated members at reduced costs. In addition, the degree of design freedom increases favorably.

Although in this example a plane-parallel plate is placed as a cover member 43 of the objective optical system 42 for photography, it is also possible to use a lens having a power as the cover member 43.

Figure 16:
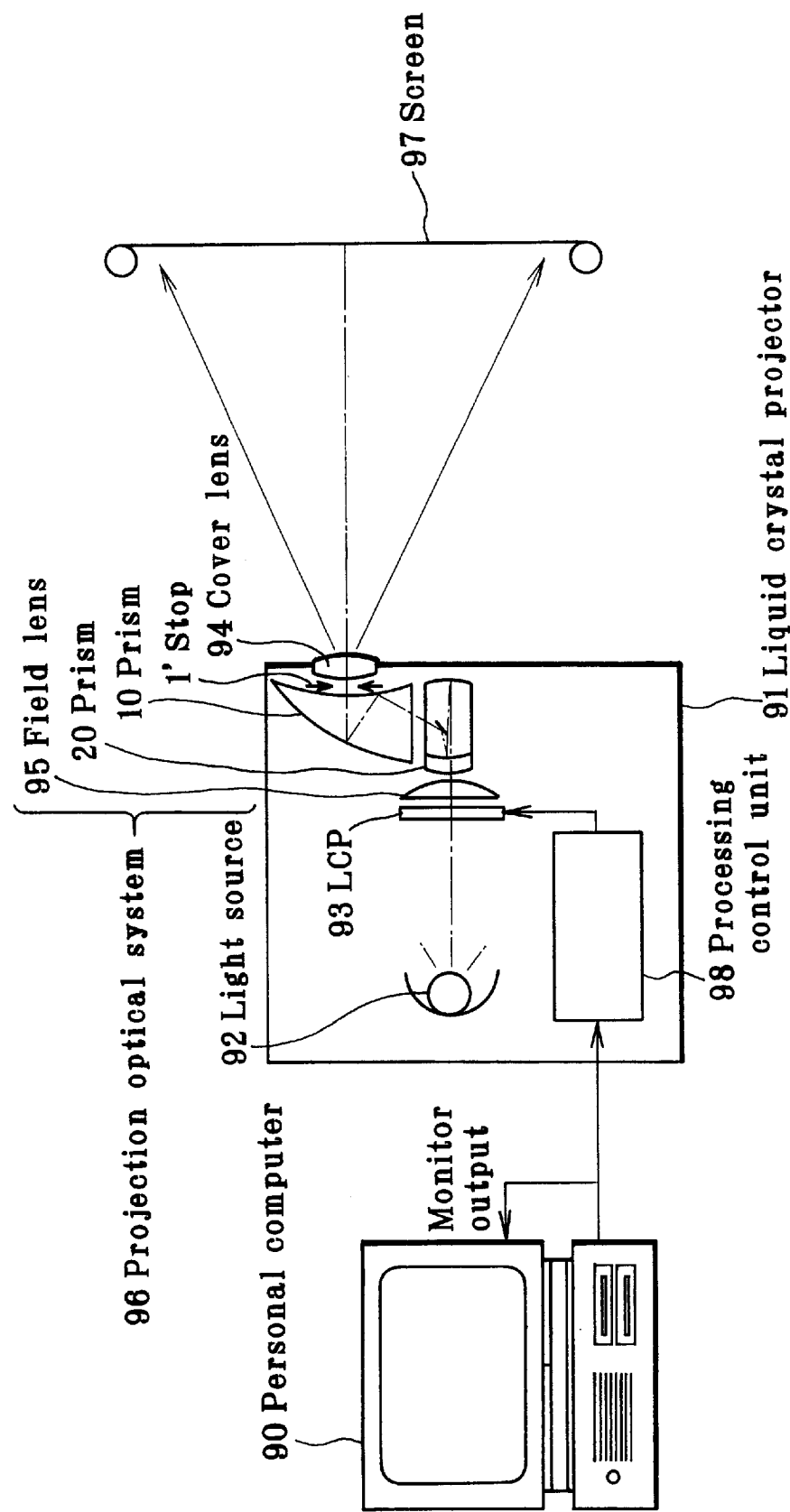
FIG. 16 is a schematic view showing an arrangement in which the optical system according to the present invention is used in a projection optical system of a presentation system.

The optical system of the image display apparatus according to the present invention can also be used as a projection optical system by placing an image plane for projection at the position of the image display device 3 and providing a screen in front of the pupil 1. FIG. 16 is a schematic view showing an arrangement in which a decentered prism optical system according to the present invention is used in a projection optical system 96 of a presentation system formed by combining together a personal computer 90 and a liquid crystal projector 91. In this example, an optical system similar to Example 2 is used in the projection optical system 96. In the figure, image and manuscript data prepared on the personal computer 90 is branched from a monitor output and delivered to a processing control unit 98 in the liquid crystal projector 91. In the processing control unit 98 of the liquid crystal projector 91, the input data is processed and output to a liquid crystal panel (LCP) 93. The liquid crystal panel 93 displays an image corresponding to the input image data. Light from a light source 92 is applied to the liquid crystal panel 93. The amount of light transmitted by the liquid crystal panel 93 is determined by the gradation of the image displayed on the liquid crystal panel 93. Light from the liquid crystal panel 93 is projected on a screen 97 through a projection optical system 96 comprising a field lens 95 placed immediately in front of the liquid crystal panel 93 and prisms 20 and 10 constituting the optical system according to the present invention, together with a cover lens 94 which is a positive lens.

The projector arranged as stated above can be constructed with a minimal number of optical members. Accordingly, a low-cost projector can be realized. In addition, the projector can be constructed in a compact form.

As will be clear from the foregoing description, the present invention provides an image display apparatus capable of attaining a reduction in overall size of the apparatus by using a three-dimensionally decentered optical system in which all the segments of an axial principal ray extending from a pupil to an image display device are not within the same plane. The image display apparatus further allows various constituent members to be effectively placed in a dead space, thereby permitting the image display apparatus to be designed in a variety of ways. In addition, the present invention provides an image display apparatus favorably corrected for decentration aberrations despite the use of an optical system decentered in a three-dimensional space.

What is claimed is:

1. An image display apparatus having a three-dimensionally decentered optical path, said image display apparatus comprising an image display device and a viewing optical system for leading an image formed by said image display device to a pupil corresponding to a position where an eyeball of an observer is to be placed, wherein said viewing optical system has at least a first reflecting surface and a second reflecting surface positioned closer to said pupil than said first reflecting surface along an optical path, wherein a first plane defined by an optical axis incident on said first reflecting surface and the optical axis reflected therefrom and a second plane defined by the optical axis incident on said second reflecting surface and the optical axis reflected therefrom intersect each other at an arbitrary angle, thereby forming a three-dimensionally decentered optical path, and wherein at least either one of said first reflecting surface and said second reflecting surface has a curved surface configuration.

2. An image display apparatus according to claim 1, wherein at least either one of said first reflecting surface and said second reflecting surface has a rotationally asymmetric curved surface configuration that corrects decentration aberrations.

3. An image display apparatus according to claim 1, wherein said viewing optical system has at least one reflecting surface in addition to said first reflecting surface and said second reflecting surface, and at least two of said plurality of reflecting surfaces have a rotationally asymmetric curved surface configuration that corrects decentration aberrations.

4. An image display apparatus according to claim 1, wherein said viewing optical system is formed from a prism member, said prism member having:
   at least said first reflecting surface and said second reflecting surface provided on surfaces of said prism member;
   a first transmitting surface through which a display light beam from said image display device enters said prism member; and
   a second transmitting surface through which said display light beam exits said prism member toward said pupil.

5. An image display apparatus according to claim 4, wherein said prism member has at least one reflecting surface closer to said pupil than said second reflecting surface, said at least one reflecting surface having a rotationally asymmetric curved surface configuration that corrects decentration aberrations.

6. An image display apparatus according to claim 5, wherein said prism member has a third reflecting surface and a fourth reflecting surface closer to said pupil than said second reflecting surface, wherein a third plane defined by the optical axis incident on said third reflecting surface and the optical axis reflected therefrom intersects the second plane defined with respect to said second reflecting surface at an angle, and a fourth plane defined by the optical axis incident on said fourth reflecting surface and the optical axis reflected therefrom is in a same plane as said third plane,
   wherein at least either one of said third reflecting surface and said fourth reflecting surface has a rotationally asymmetric curved surface configuration that corrects decentration aberrations.

7. An image display apparatus according to claim 6, wherein both said third reflecting surface and said fourth reflecting surface have a rotationally asymmetric curved surface configuration that corrects decentration aberrations.

8. An image display apparatus according to claim 6, wherein said prism member is arranged so that a light beam is incident on said second transmitting surface at an angle exceeding a total reflection critical angle, thereby allowing said second transmitting surface to serve also as said third reflecting surface, whereby said third reflecting surface is formed from an identical surface with said second transmitting surface, and wherein the light beam reflected by a totally reflecting action of said third reflecting surface is reflected by said fourth reflecting surface, and the light beam reflected from said fourth reflecting surface passes through said second transmitting surface to exit said prism member.

9. An image display apparatus according to claim 4, wherein said prism member has a plurality of reflecting surfaces, including said first reflecting surface, in an optical path between said first transmitting surface and said second reflecting surface, and at least one of said plurality of reflecting surfaces, exclusive of said first reflecting surface, has a rotationally asymmetric curved surface configuration that corrects decentration aberrations.

10. An image display apparatus according to claim 9, wherein said prism member has said first reflecting surface and a fifth reflecting surface in order mentioned along the optical path between said first transmitting surface and said second reflecting surface, wherein a fifth plane defined by the optical axis incident on said fifth reflecting surface and the optical axis reflected therefrom is in a same plane as the first plane defined with respect to said first reflecting surface.

11. An image display apparatus according to claim 10, wherein said first reflecting surface is provided on a surface of said prism member at a tilt so as to reflect the light beam entering through said first transmitting surface toward a position closer to said second reflecting surface than a direction of incidence of said light beam,
   said fifth reflecting surface being provided on a surface of said prism member at a tilt so as to reflect the light beam reflected from said first reflecting surface toward a position closer to said second reflecting surface than a direction of incidence of said light beam.

12. An image display apparatus according to claim 10, wherein said first reflecting surface is provided on a surface of said prism member at a tilt so as to reflect the light beam entering through said first transmitting surface toward a position more away from said second reflecting surface than a direction of incidence of said light beam,
   said fifth reflecting surface being provided on a surface of said prism member at a tilt so as to reflect the light beam reflected from said first reflecting surface toward a position closer to said second reflecting surface than a direction of incidence of said light beam, and
   wherein said prism member is arranged so that an optical path connecting said first transmitting surface and said first reflecting surface and an optical path connecting said fifth reflecting surface and said second reflecting surface intersect each other within said prism member.

13. An image display apparatus according to claim 4, wherein said prism member has a first prism and a second prism that are separated by at least an air layer,
   said first prism having at least said first reflecting surface and said second reflecting surface and forming a three-dimensionally decentered optical path.

14. An image display apparatus according to claim 13, wherein said first prism has a first prism exit surface through which the light beam reflected from said second reflecting surface exits said first prism toward said second prism, and there is no reflecting surface between said second reflecting surface and said first prism exit surface.

15. An image display apparatus according to claim 13, wherein said prism member has a first prism and a second prism that are separated by at least an air layer,
   wherein an exit surface of said first prism that faces said second prism across said air layer has a rotationally asymmetric curved surface configuration that corrects decentration aberrations.

16. An image display apparatus according to claim 13, wherein said prism member has a first prism and a second prism that are separated by at least an air layer,
   wherein an entrance surface of said second prism that faces said first prism across said air layer has a rotationally asymmetric curved surface configuration that corrects decentration aberrations.

17. An image display apparatus according to claim 4, wherein said first transmitting surface has a rotationally asymmetric curved surface configuration that corrects decentration aberrations.

18. An image display apparatus according to claim 4, wherein said second transmitting surface has a rotationally asymmetric curved surface configuration that corrects decentration aberrations.

19. An image display apparatus according to claim 1, wherein said viewing optical system is arranged to form the image of said image display device as an intermediate image in a vicinity of said second reflecting surface and to lead said intermediate image to said pupil.

20. An image display apparatus according to claim 19, wherein said viewing optical system is arranged to form said intermediate image at a position closer to said pupil than said second reflecting surface.

21. An image display apparatus according to claim 2, wherein said rotationally asymmetric curved surface configuration that corrects decentration aberrations is formed from a rotationally asymmetric aspherical surface having not more than two planes of symmetry.

22. An image display apparatus according to claim 21, wherein said rotationally asymmetric aspherical surface is a free-form surface having only one plane of symmetry.

23. An image pickup apparatus having a three-dimensionally decentered optical path, said image pickup apparatus comprising:

said image display apparatus according to claim 1; and an image pickup device provided in place of said image display device;

wherein said pupil is arranged as an entrance pupil through which a light beam from a subject passes, and said viewing optical system is used as an image-forming optical system that focuses the light beam from the subject to form a subject image on said image pickup device.

24. A projection apparatus having a three-dimensionally decentered optical path, said projection apparatus comprising:

said image display apparatus according to claim 1; and a projection image plane provided in place of said image display device;

wherein when a screen is placed in front of said pupil, said viewing optical system is used as a projection optical system that projects a light beam from said projection image plane onto said screen as a projected image.

* * * * *